United States Patent [19]

Cooper et al.

[11] Patent Number: 5,737,416
[45] Date of Patent: Apr. 7, 1998

[54] METHOD AND APPARATUS FOR ENABLING TRIAL PERIOD USE OF SOFTWARE PRODUCTS: METHOD AND APPARATUS FOR UTILIZING A DECRYPTION STUB

[75] Inventors: Thomas Edward Cooper, Louisville; Hudson Wayne Phillips, Boulder; Robert Franklin Pryor, Longmont, all of Colo.

[73] Assignee: International Business Machines Corporation, Armonk, N.Y.

[21] Appl. No.: 693,555

[22] Filed: Aug. 2, 1996

Related U.S. Application Data

[63] Continuation of Ser. No. 235,033, Apr. 25, 1994, abandoned.

[51] Int. Cl.[6] .................................................... H04L 9/00
[52] U.S. Cl. ................................ 380/4; 380/9; 380/23; 380/25; 380/49; 380/50; 395/186; 395/427; 395/481; 395/490; 395/491
[58] Field of Search ........................ 380/4, 9, 21, 23, 380/25, 49, 50; 395/601, 616, 186, 427, 481, 490, 491, 726, 728

[56] References Cited

U.S. PATENT DOCUMENTS

| | | | |
|---|---|---|---|
| 4,864,616 | 9/1989 | Pond et al. | 380/25 |
| 4,888,798 | 12/1989 | Earnest | 380/4 |
| 5,021,997 | 6/1991 | Archie et al. | 395/575 |
| 5,155,847 | 10/1992 | Kirouac et al. | 395/600 |
| 5,166,886 | 11/1992 | Molnar et al. | 364/479 |
| 5,341,429 | 8/1994 | Stringer et al. | 380/23 |

FOREIGN PATENT DOCUMENTS

| | | | |
|---|---|---|---|
| 0 268 139 A2 | 5/1988 | European Pat. Off. | G06F 1/00 |
| 0 268 139 A3 | 5/1988 | European Pat. Off. | G06F 1/00 |
| 0 561 685 A2 | 9/1993 | European Pat. Off. | G06F 12/14 |
| 0 561 685 A3 | 9/1993 | European Pat. Off. | G06F 12/14 |
| 0 598 587 A1 | 5/1994 | European Pat. Off. | G06F 1/00 |
| 0 601 500 A1 | 6/1994 | European Pat. Off. | G06F 1/00 |
| 2 136 175 | 9/1984 | United Kingdom | H03K 13/24 |
| WO 94/07204 | 3/1994 | WIPO | G06F 15/21 |

OTHER PUBLICATIONS

"Data Masking Algorithm" (IBM Technical Disclosure Bulletin, vol. 32, No. 6B, Nov. 1989).

"Information Distribution via Rom Disks" (IBM Technical Disclosure Bulletin, vol. 33 No. 12, May 1991).

*Primary Examiner*—Bernarr E. Gregory
*Attorney, Agent, or Firm*—Edward H. Duffield; Andrew J. Dillon

[57] ABSTRACT

A method and apparatus is provided in a data processing system for securing access to particular files which are stored in a computer-accessible memory media. A file management program is provided as an operating system component of the data processing system. At least one encrypted file and at least one unencrypted file are stored in the computer-accessible memory media. An unencrypted security stub is associated with each of the encrypted files. The security stub is at least partially composed of executable code. The file management program is utilized to monitor data processing calls for a called file stored in the computer-accessible memory media. The file management program determines what the called file has an associated unencrypted security stub. The called file is processed in a particular manner dependent upon whether or not the called file has an associated unencrypted security stub.

22 Claims, 28 Drawing Sheets

FIG. 8

Order Form

WordPerfect CORPORATION — 251

Order toll free * 24 hours a day * 7 days a week
1 - 800 - 724 - 9999

Media ID: 12345ABC — 269
Machine ID: X565-853-9000 — 271
Customer ID: C123-456-789 — 273

ITEM — 255   DESCRIPTION — 260   PRICE — 253
1234567890123456   Lotus 1-2-3 for Windows   $49.95

257
259

Delete — 261

SUBTOTAL: $49.95 — 263

Does not include applicable tax and shipping and handling charges. Prices subject to change.

Payment methods accepted: — 265
VISA — Purchase order — Check/money order — Gift certificate

267

Close   Fax   Mail   Print   Unlock   Help

Order Information

Address Information
◉ Customer address    ◉ Ship to address (if different)

Name: Hillary Clinton — 277

Address: The White House / 1600 Pennsylvania Ave. / Washington, D.C., 11112-5993 / U.S.A. — 279

Phone: (410) 555-4392 ext.4990 — 281

Fax: (410) 555-4300 — 283

Ship method: Federal Express — 287

Payment method: Visa — 285

Payment Information
Account number: 4438-3902-9392-3333 — 289

Expiration date: 6/95 — 291

VAT ID: 1234567890 — 293

[ ? ]

[ Print ] — 295    [ Cancel ] — 297

1. HARD DISK SERIAL NO.
2. SIZE OF HARD DISK
3. FORMAT OF HARD DISK
4. SYSTEM MODEL NO.
5. HARDWARE INTERFACE CARD
6. HARDWARE SERIAL NO.
7. CONFIGURATION PARAMETERS

METHOD AND APPARATUS FOR ENABLING TRIAL PERIOD USE OF SOFTWARE PRODUCTS: METHOD AND APPARATUS FOR UTILIZING A DECRYPTION STUB

CROSS-REFERENCE TO RELATED APPLICATIONS

This is a continuation of application Ser. No. 08/235,033, filed 25 Apr. 1994, now abandoned.

The present application is related to U.S. patent application Ser. No. 08/235,035, entitled "Method and Apparatus for Enabling Trial Period Use of Software Products: Method and Apparatus for Allowing a Try-and-Buy User Interaction," further identified by Attorney Docket No. DA9-94-008; U.S. patent application Ser. No. 08/235,032, now abandoned, entitled "Method and Apparatus for Enabling Trial Period Use of Software Products: Method and Apparatus for Generating a Machine-Dependent Identification," further identified by Attorney Docket No. DA9-94-009; U.S. patent application Ser. No. 08/235,031, now U.S. Pat. No. 5,598,470, entitled "Method and Apparatus for Enabling Trial Period Use of Software Products: Method and Apparatus for Utilizing an Encryption Header," further identified by Attorney Docket No. DA9-94-010; and U.S. patent application Ser. No. 08/238,418, now U.S. Pat. No. 5,563,946, entitled "Method and Apparatus for Enabling Trial Period Use of Software Products: Method and Apparatus for Allowing the Distribution of Software Objects," further identified by Attorney Docket No. DA9-94-011, all filed Apr. 24, 1994 by the inventors hereof and assigned to the assignee herein, and incorporated by reference herein.

BACKGROUND OF THE INVENTION

1. Technical Field

The present invention relates in general to techniques for securing access to software objects, and in particular to techniques for temporarily encrypting and restricting access to software objects.

2. Description of the Related Art

The creation and sale of software products has created tremendous wealth for companies having innovative products, and this trend will continue particularly since consumers are becoming ever-more computer literate as time goes on. Computer software is difficult to market since the potential user has little opportunity to browse the various products that are available. Typically, the products are contained in boxes which are shrink-wrapped closed, and the potential customer has little or no opportunity to actually interact with or experience the software prior to purchasing. This causes considerable consumer dissatisfaction with products, since the consumer is frequently forced to serially purchase a plurality of software products until an acceptable product is discovered. This is perhaps one significant cause of the great amount of software piracy which occurs in our economy. A potential software purchaser will frequently "borrow" a set of diskettes from a friend or business associate, with the stated intention of using the software for a temporary period. Frequently, such temporary use extends for long intervals and the potential customer may never actually purchase a copy of the software product, and may instead rely upon the borrowed copy.

Since no common communication channel exists for the sampling of software products, such as those created in movie theaters by movie trailers, and in television by commercials, software manufacturers are forced to rely upon printed publications and direct mail advertisements in order to advertise new products and solicit new customers. Unfortunately, printed publications frequently fail to provide an accurate description of the product, since the user interaction with the product cannot be simulated in a static printed format. The manufacturers of computer software products and the customers would both be well served if the customers could have access to the products prior to making decisions on whether or not to purchase the product, if this could be accomplished without introducing risk of unlawful utilization of the product.

The distribution of encrypted software products is one mechanism a software vendor can utilize to distribute the product to potential users prior to purchase; however, a key must be distributed which allows the user access to the product. The vendor is then forced to rely entirely upon the honesty and integrity of a potential customer. Unscrupulous or dishonest individuals may pass keys to their friends and business associates to allow unauthorized access. It is also possible that unscrupulous individuals may post keys to publicly-accessible bulletin boards to allow great numbers of individuals to become unauthorized users. Typically, these types of breaches in security cannot be easily prevented, so vendors have been hesitant to distribute software for preview by potential customers.

SUMMARY OF THE INVENTION

It is one object of the present invention to provide a method and apparatus for distributing software objects from a producer to potential users which allows the user a temporary trial period without subjecting the software product to unnecessary risks of piracy or unauthorized utilization beyond the trial interval. Preferably this is accomplished by providing a software object on a computer-accessible memory media along with a file management program. Preferably, the software object is reversibly functionally limited, through one or more particular encryption operations. The computer-accessible memory media is shipped from the producer to the potential user utilizing conventional mail and delivery services. Upon receipt, the potential user loads the file management program into a user-controlled data processing system and associates it with the operating system for the data processing system. Then, the computer-accessible memory media is read utilizing the user-controlled data processing system. The file management program is executed by the user-controlled data processing system and serves to restrict access to the software object for a predefined and temporary trial period. During the temporary trial mode of operation, the software object is temporarily enabled by reversing the reversible functional limitation of the software object. This is preferably accomplished by decryption of the encrypted software object when the software object is called by the operating system of the user-controlled data processing system. The file management program preferably prevents copying operations, so the encrypted software project is temporarily decrypted when it is called by the operating system. If the potential user elects to purchase the software object, a permanent use mode of operation is entered, wherein the functional limitation of the software object is permanently reversed, allowing unlimited use to the software object by the potential user. This facilitates browsing operations which allow the potential user to review the software and determine whether it suits his or her needs.

The file management program continuously monitors the operating system of the user-controlled data processing system for operating system input calls and output calls. The file management program identifies when the operating system of the user-controlled data processing system calls for a software object which is subject to trial-interval browsing. Then, the file management system fetches a temporary access key associated with the software object, and then examines the temporary access key to determine if it is valid. Next, the file management program reverses the functional limitation of the software object, and passes it to the data processing system for processing.

It is another objective of the present invention to provide a method and apparatus for distributing a software object from a source to a user, wherein a software object is encrypted utilizing a long-lived encryption key, and directed from the source to the user. The encrypted software object is loaded onto a user-controlled data processing system having a particular system configuration. A numerical machine identification based at least in part upon the particular configuration of the user-controlled data processing system is then derived. Next, a temporary key is derived which is based at least in part upon the numerical machine identification and the long-lived encryption key. A long-lived key generator is provided for receiving the temporary key and producing the long-lived encryption key. The temporary key allows the user to generate for a prescribed interval the long-lived encryption key to access the software object. These operations are performed principally by a file management program which is operable in a plurality of modes. These modes include a set up mode of operation, a machine identification mode of operation, and a temporary key derivation mode of operation. During the set up mode of operation, the file management program is loaded onto a user-controlled data processing system and associated with an operating system for the user-controlled data processing system. During the machine identification mode of operation, the file management program is utilized to derive a numerical machine identification based upon at least on attribute of the user-controlled data processing system. During the temporary key derivation mode of operation, a temporary key is derived which is based at least in part upon the numerical machine identification. The file management program also allows a trial mode of operation, wherein the file management program is utilized by executing it with the user-controlled data processing system to restrict access to the software object for an interval defined by the temporary key, during which the long-lived key generator is utilized in the user-controlled data processing system to provide the long-lived key in response to receipt of at least one input including the temporary key.

It is yet another objective of the present invention to provide a method and apparatus in a data processing system for securing access to particular files which are stored in a computer-accessible memory media. A file management program is provided as an operating system component of the data processing system. A plurality of files are stored in the computer-accessible memory media, including at least one encrypted file and at least one unencrypted file. For each encrypted file, a preselected portion is recorded in computer memory, a decryption block is generated which includes information which can be utilized to decrypt the file, and the decryption block is incorporated into the file in lieu of the preselected portion which has been recorded elsewhere in computer memory. The file management program is utilized to monitor data processing operation calls for a called file stored in the computer-accessible memory media. The file management program determines whether the called file has an associated decryption block. The file management program processes the called file in a particular manner dependent upon whether or not the called file has an associated decryption block. The incorporation of the decryption block does not change the size of the encrypted file, thus preventing certain types of processing errors. During the trial interval, the encrypted file is maintained in an encrypted condition, and cannot be copied. If the potential user opts to purchase the software product, a permanent key is provided which results in replacement of the preselected portion to the file in lieu of the decryption block. Once the decryption block is removed, the encrypted file may be decrypted to allow unrestricted use by the purchaser. Preferably, the file management program is utilized to intercept files as they are called by the operating system, and to utilize the decryption block to derive a name for a key file and read the called file. The decryption block of each encrypted file includes a validation segment which is decrypted by the file management program and compared to a selected segment for the called file to determine whether the key can decrypt the particular file. If the decrypted validation segment matches a known clear text validation segment, the file is then dynamically decrypted as it is passed for further processing.

It is yet another objective of the present invention to provide a method and apparatus in a data processing system for securing access to particular files which are stored in a computer-accessible memory media. A file management program is provided as an operating system component of a data processing system. In a computer-accessible memory media available to the data processing system, at least one encrypted file and one unencrypted file are stored. The encrypted file has associated with it an unencrypted security stub which is at least partially composed of executable code. The file management program is utilized to monitor the data processing system calls for a called file stored in the computer accessible memory media, to determine whether the called file has an associated unencrypted security stub, and to process the called file in a particular manner dependent upon whether or not the called file has an associated unencrypted security stub. More particularly, if it is determined that the called file has no associated unencrypted security stub, the called file is allowed to be processed. However, if it is determined that the called file has an associated unencrypted security stub, it must be examined before a decision can be made about whether or not to allow it to be processed. First, the unencrypted security stub is examined in order to obtain information which allows decryption operations to be performed. Then, the decryption operations are performed. Finally, the called file is allowed to pass for further processing. Preferably, the called file is dynamically decrypted as it is passed to the operating system for processing. Also, the unencrypted security stub is separated from the called file prior to execution of the called file. However, if the unencrypted security stub accidentally remains attached to the called file, processing operations must be stopped, and a message must be posted in order to prevent the processor from becoming looked-up.

It is still another objective of the present invention to provide a method and apparatus for distributing a software object from a source to a user. A computer-accessible memory media is distributed from the source to a potential user. It includes a software object which is encrypted utilizing a predetermined encryption engine and a long-lived and secret key. An interface program is provided which facilitates interaction between the source and the user. The interface program includes machine identification module which generates a machine identification utilizing at least on predetermined attribute of the user-controlled data processing system. It also further includes a long-lived and secret key generator which receives as an input at least a temporary key and produces as an output a long-lived and secret key. A validation module is provided which tests temporary key determined its validity. The source of the software object maintains a temporary key generator which receives as an input at least a machine identification and produces an output of the temporary key. An interface program is loaded onto the user-controlled data processing system. The machine identification module is utilized to examine at least one predetermined attribute of the user-controlled data processing system and to generate the machine identification. During interaction between the source and the user, the machine identification is communicated over an insecure communication channel. At the source of the software object, the temporary key is generated utilizing the machine identification (and other information) as an input to the temporary key generator. During interaction between the source and the user, the temporary key is communicated, typically over an insecure communication channel. Next, the validation module is utilized to determine the validity of the temporary key. The long-lived and secret key generator is then utilized to receive the temporary key and generate the long-lived and secret key in order to decrypt and temporarily gain access to the software object. The user is also provided with an import module and an export module which allow for the utilization of portable memory media to transfer the encrypted software object, a key file, and a machine identification file from one machine in a distributed data processing system to another machine in the distributed data processing system, while allowing the temporary key to allow temporary trial access to the software object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8, 9, 10a, and 10b depict user interface screens which facilitate trial period operations in accordance with the present invention;

DETAILED DESCRIPTION OF PREFERRED EMBODIMENT

Figure 1:
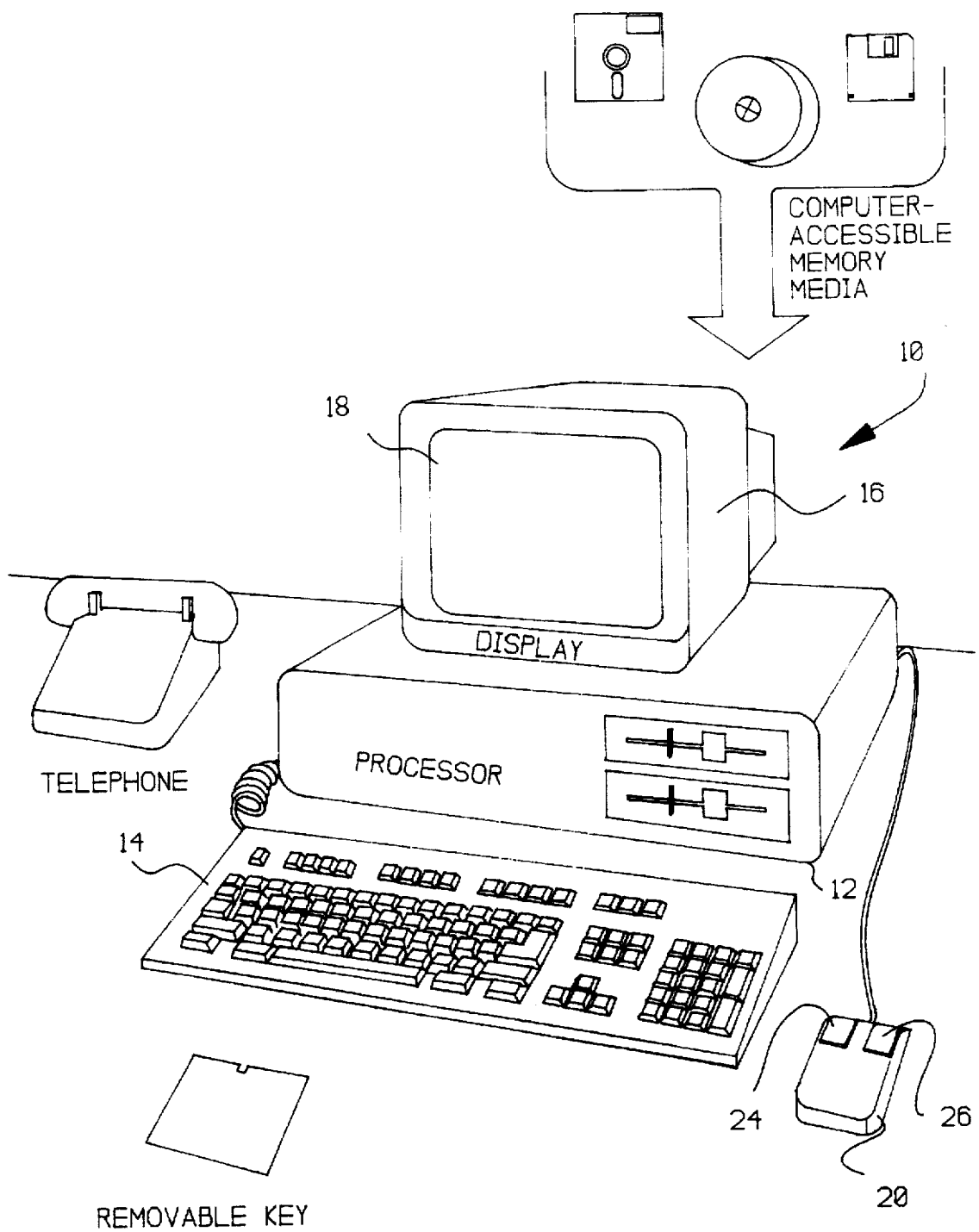
FIG. 1 is a pictorial representation of a stand-alone data processing system, a telephone, and a variety of computer-accessible memory media all of which may be utilized in the implementation of the preferred technique of enabling trial period use of software products.
Figure 2:
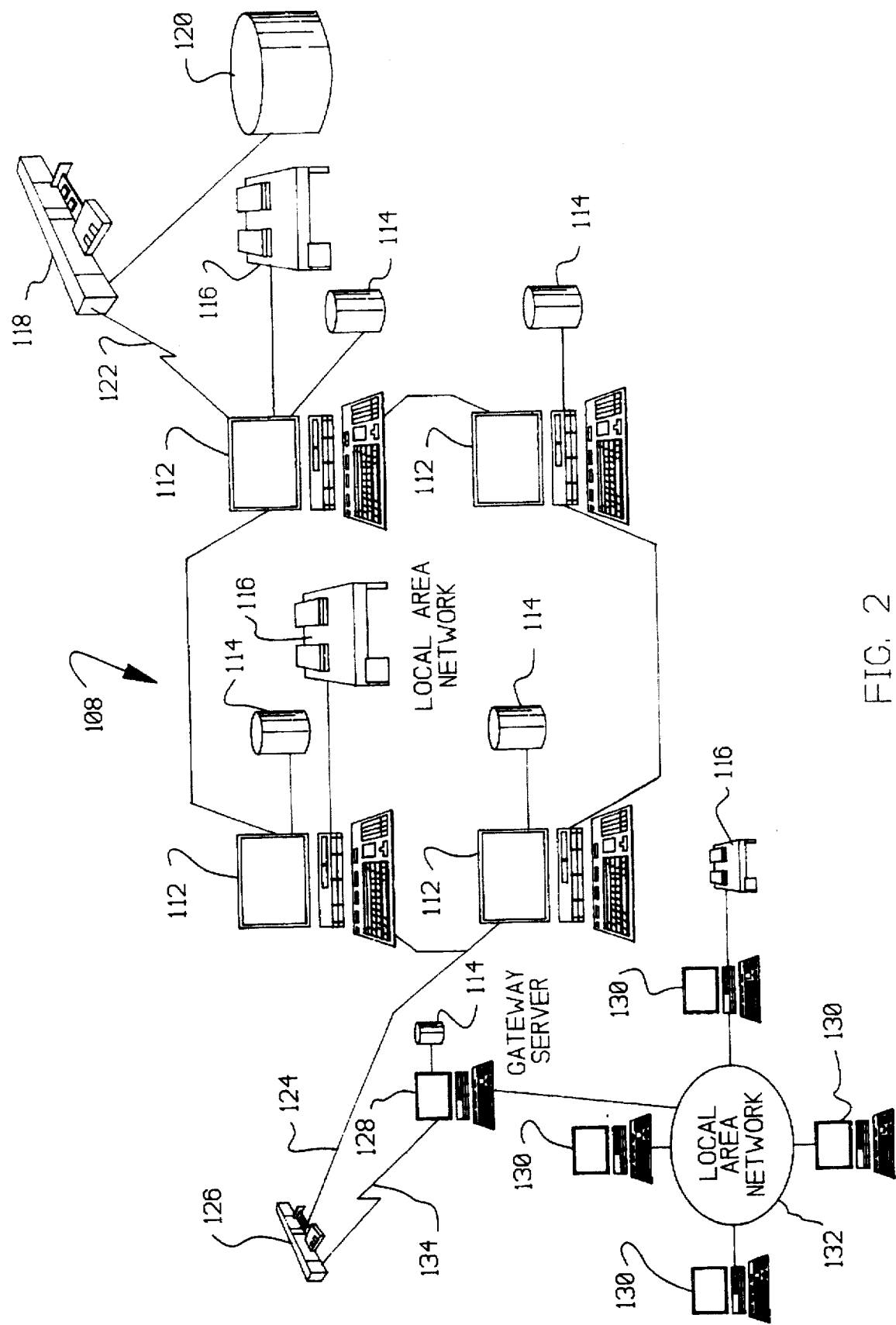
FIG. 2 is a pictorial representation of a distributed data processing system which may utilize the technique of the present invention of enabling trial period use of software products.
Figure 3:
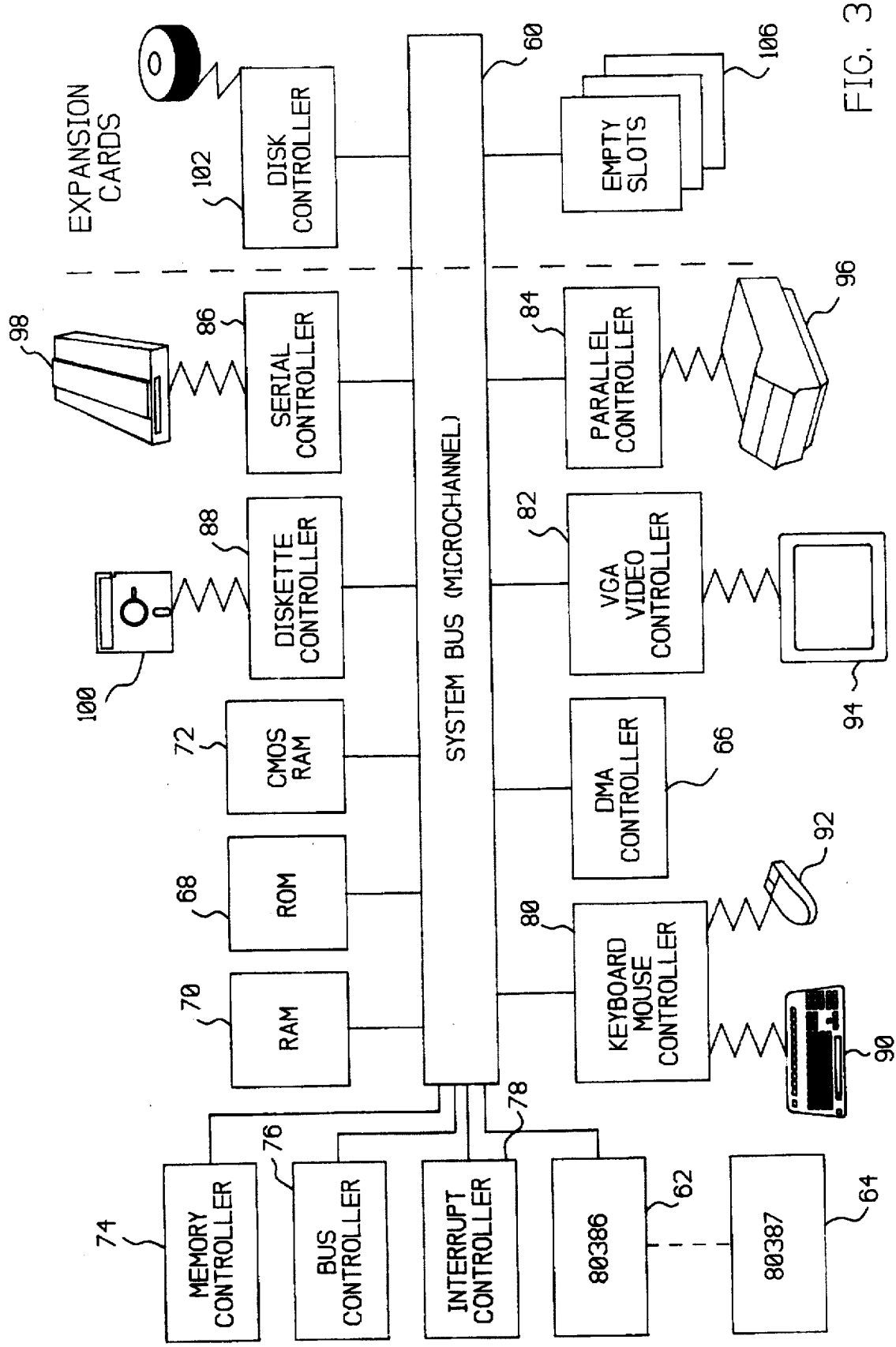
FIG. 3 is a block diagram representation of data processing system attributes which may be utilized to generate a machine identification, in accordance with the present invention.

The method and apparatus of the present invention for enabling trail period use of software products can be utilized in stand-alone PCs such as that depicted in FIG. 1, or in distributed data processing systems, such as that depicted in FIG. 2. In either event, temporary trial period access to one or more software products depends upon utilization of the trial product on a particular data processing system with particular data processing system attributes. This is accomplished by encrypting the trial software product utilizing a temporary access key which is based upon one or more data processing system attributes. FIG. 3 graphically depicts a plurality of system configuration attributes, which may be utilized in developing a temporary access key, as will be described in greater detail herebelow. To begin with, the environment of the stand-alone data processing system of FIG. 1, and the distributed data processing system of FIG. 2 will be described in detail, followed by a description of particular system configuration attributes which are depicted in FIG. 3.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 16 which may be implemented utilizing either a color or monochromatic monitor, in a manner well known in the art. Also coupled to processor 12 is keyboard 14. Keyboard 14 preferably comprises a standard computer keyboard which is coupled to the processor by means of a cable.

Also coupled to processor 12 is a graphical pointing device, such as mouse 20. Mouse 20 is coupled to processor 12, in a manner well known in the art, via a cable. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, N.Y.

While the present invention may be utilized in stand-alone data processing systems, it may also be utilized in a distributed data processing system, provided the import and export routines of the present invention are utilized to transfer one or more encrypted files, their encrypted key files, and associated file management programs through a portable memory media (such as diskettes or tapes) between particular data processing units within the distributed data processing system. While the import and export routines of the present invention will be described in greater detail herebelow, it is important that a basic distributed data processing system be described and understood.

FIG. 3 provides a block diagram depiction of a plurality of data processing system attributes which may be utilized to uniquely identify a particular data processing system (whether a stand-alone or a node in a distributed data processing system), and which further can be utilized to generate in the machine identification value which is utilized to derive or generate a temporary access product key which may be utilized to gain access to an encrypted product for a particular predefined trial interval. A data processing system may include a particular system bus 60 architecture, a particular memory controller 74, bus controller 76, interrupt controller keyboard mouse controller 80, DMA controller 66, VGA video controller 82, parallel controller 84, serial controller 86, diskette controller 88, and disk controller 82. Additionally, a plurality of empty or occupied slots 106 may be used to identify the particular data processing system. Each particular data processing system may have attributes which may be derived from RAM ROM 68, or CMOS RAM 72. End devices such as printer 96, monitor 94, mouse 92, keyboard 90, diskette 100, or disk drive 104 may be utilized to derive one or more attributes of the data processing system which may be processed in a predetermined manner to derive a machine identification value. The derivation of the machine identification value will be described in greater detail below. The present invention is directed to an efficient method of distributing software programs to users which would provide to them a means to try the program before obtaining (by purchasing) a license for it. In accordance with this concept, complete programs are distributed to potential users on computer-accessible memory media such as diskettes or CD-ROMs. The concept is to generate keys that allow the user to access the programs from the distributed media. In this environment, a file management program provides a plurality of interfaces which allows the user to browse the different products. The interfaces allow ordering and unlocking of the software products contained on the distributed media. Unlocking of the software product is accomplished by the reception, validation, and recording of a temporary access (decryption) key.

The file management program is resident in the user-controlled data processing system and becomes a part of the operating system in the user's computer. An example of such a resident program (in the PC DOS environment) would be a resident program TSR, for "terminate and stay resident" operations, that intercepts and handles DOS file input and output operations. When a temporary access key is provided to a user, system files are checked to see if this file has been used in a trial mode of operation before. If the product has never been used in a trial mode of operation, the temporary key is saved. Once the trial mode of operation key exists, an encrypted application can only be run if it is initiated by the file management program. The file management program will recognize that the application is encrypted and that a valid trial mode of operation key exists for the particular operation. A valid trial mode of application key is one that has not expired. The trial mode of operation may be defined by either a timer, or a counter. A timer can be used to count down a particular predefined period (such as thirty days); alternatively, the counter can be used to decrement through a predefined number of trial "sessions" which are allowed during the trial mode of operation. If the key is valid, the file management program communicates directly with the TSR and enables the trial mode of operation for a particular encrypted application. The file management program then kicks off the encrypted application. The code which is resident in the operating system of the user-controlled data processing system maintains control over the operating system. It monitors the use of the trial mode of operation keys to allow files to be decrypted and loaded into memory, but prevents the encrypted files from being decrypted and copied to media. This is done by using the operating system to determine which applications are trying to access the data and only allowing the applications that have permission to access the data to do so.

Figure 4:
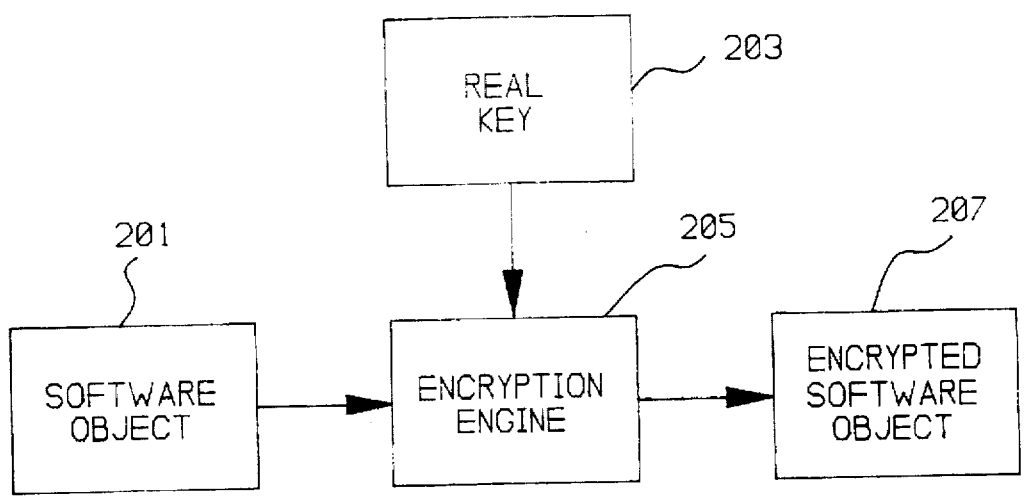
FIG. 4 is a block diagram depiction of a routine for encrypting software objects.

FIG. 4 is a block diagram depiction of a routine for encrypting software objects. The binary characters which make up software object 201 are supplied as an input to encryption engine 205. Real key 203 is utilized as an encryption key in encryption engine 205. The output of encryption engine 205 is an encrypted software object 207. Encryption engine 205 may be any conventional encryption operation such as the published and well known DES algorithm; alternatively, the encryption engine 205 may be an exclusive-OR operation which randomizes software object 201.

Figure 5:
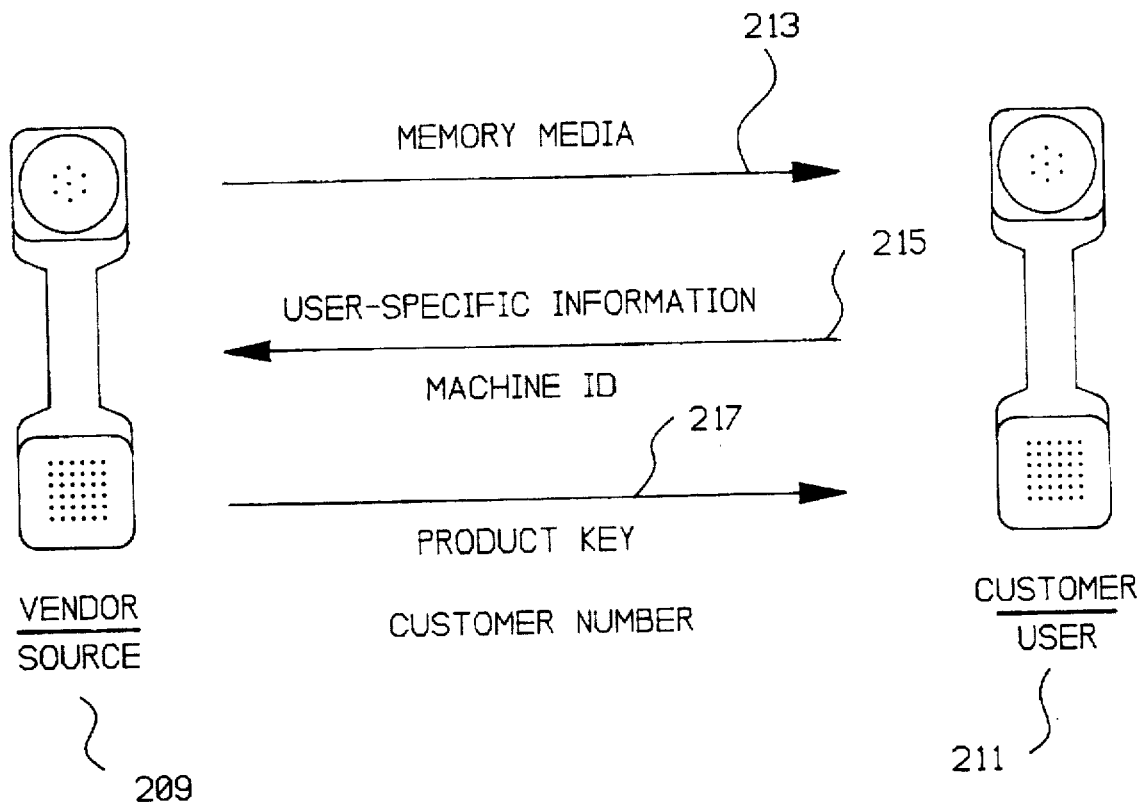
FIG. 5 is a pictorial representation of the exchange of information between a source (a software vendor) and a user (a customer), in accordance with the teachings of the present invention.

FIG. 5 is a pictorial representation of the exchange of information between a source 209 (a software vendor) and a user 211 (a potential customer, in accordance with the teachings of the present invention. The arrows between source 209 and user 211 represent exchanges of objects or information between vendor 209 and 211. In the exchange of flow 203, computer-accessible memory media is directed from source 209 to user 211. This transfer may occur by US mail delivery, courier delivery, express service delivery, or by delivery through printed publications such as books and magazines. Alternatively, an electronic document may be transferred from source 209 to user 211 utilizing electronic mail or other transmission techniques. In flow 215, user-specific information, preferably including a unique machine identification number which identifies the data processing system of user 211, is transferred from user 211 to source 209 via an insecure communication channel; typically, this information is exchanged over the telephone, but may be passed utilizing electronic mail or other communication techniques. In flow 217, source 209 provides a product key to user 211. The product key allows the product contained in the memory media to be temporarily accessed for a prescribed and predefined interval. This interval is considered to be a "trial" interval during which user 211 may become familiar with the software and make a determination on whether or not he or she wishes to purchase the software product. User 211 must communicate additionally with source 209 in order to obtain permanent access to the software product. The product key allows user 211 to obtain access to the software product for a particular predefined time interval, or for a particular number of predefined "sessions." As time passes, the user's clock or counter runs down. At the termination of the trial period, further access is denied. Therefore, the user 211 must take affirmative steps to contact source 209 and purchase a permanent key which is communicated to user 211 and which permanently unlocks a product to allow unrestricted access to the software product.

Figure 6:
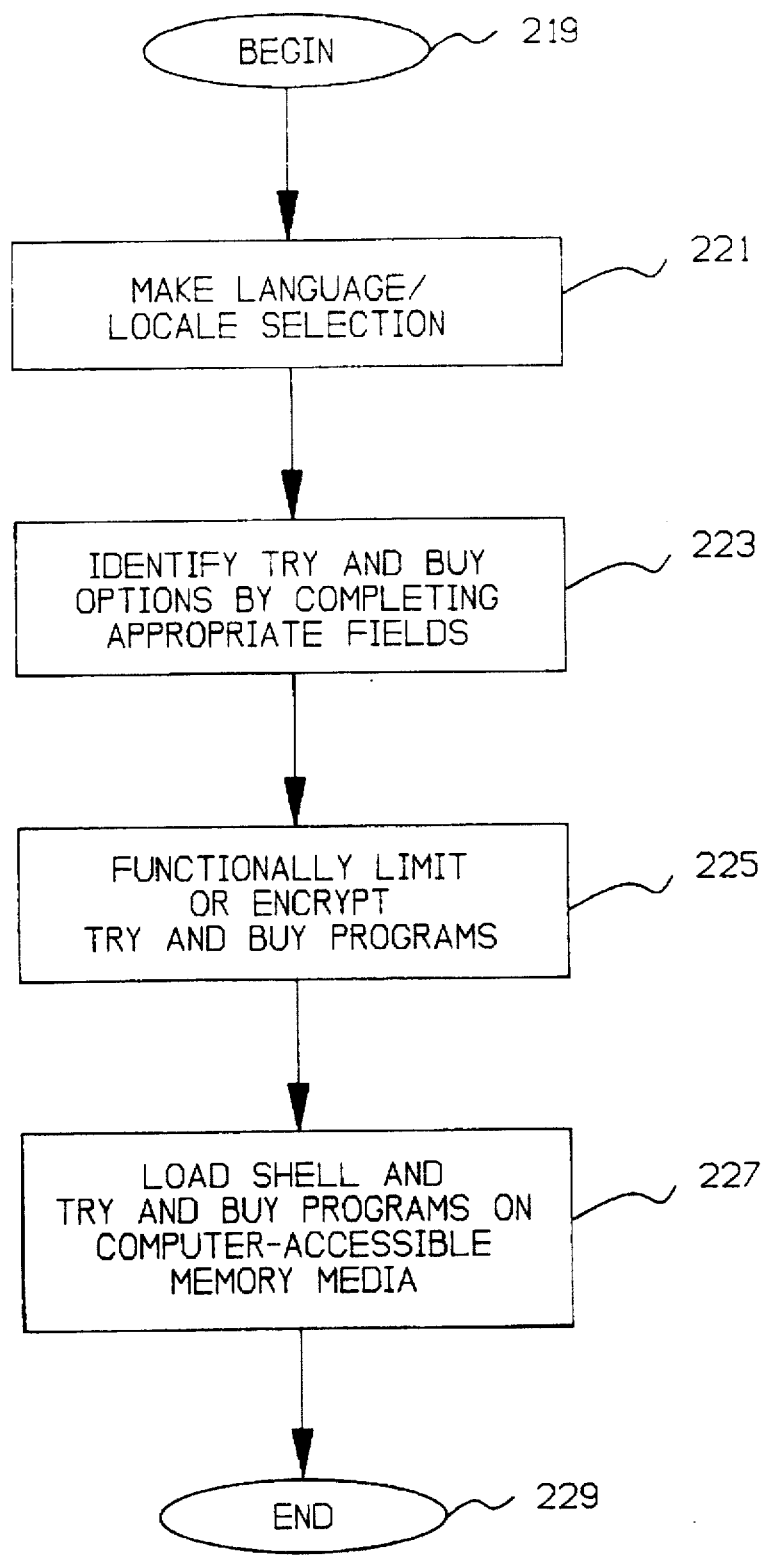
FIG. 6 is a flowchart representation of the broad steps employed in building a user interface shell, in accordance with the present invention.

The communication between source 209 and user 211 is facilitated by a user interface. The creation of the interface is depicted in flowchart form in FIG. 6. The process begins at software block 219, and continues at software block 221, wherein source 209 makes language and locale selections which will determine the language and currencies utilized in the interface which facilitates implementation of the trial period use of the software products. A plurality of software products may be bundled together and delivered to user 211 on a single computer-accessible memory media. Therefore, in accordance with software block 223, source 209 must make a determination as to the programs which will be made available on a trial basis on the computer-accessible memory media, and the appropriate fields are completed, in accordance with software block 223. Next, in accordance with software block 225, the programs are functionally limited or encrypted. Then, in accordance with software block 227, the shell is loaded along with the computer program products onto a computer-accessible memory media such as a diskette or CD ROM. The process ends at software block 229.

Figure 7:
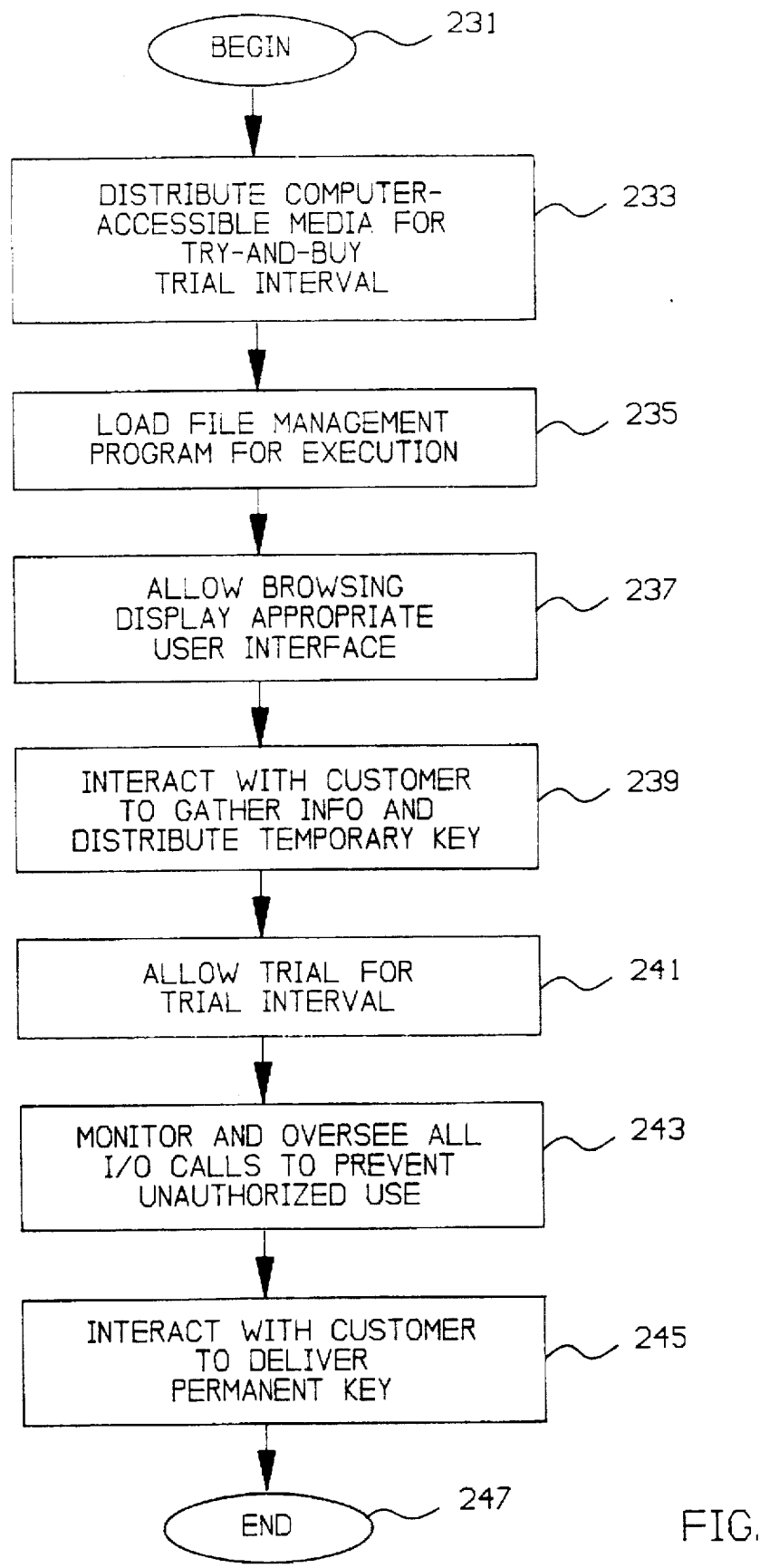
FIG. 7 is a flowchart representation of vendor and customer interaction in accordance with the present invention.

FIG. 7 is a flowchart representation of vendor and customer interaction in accordance with the present invention. The flow begins at software block 231, and continues at step 233, wherein computer-accessible memory media are distributed to users for a try-and-buy trial interval. Then, in accordance with step 235, the file management program is loaded from the computer-accessible memory media onto a user-controlled data processing system for execution. The file management program includes a plurality of interface screens which facilitate interaction between the vendor and the customer, which and which set forth the options available to the customer. Thus, in accordance with step 237, the file management program allows browsing and displays appropriate user interfaces. Next, in accordance with step 239, the customer and the vendor interact, typically over the telephone or electronic mail, to allow the vendor to gather information about the customer and to distribute a temporary key which allows access to one or more software products which are contained on the computer-accessible memory media for a predefined trial interval. Typically, the interval will be defined by an internal clock, or by a counter which keeps track of the number of sessions the potential purchaser has with a particular software product or products. Step 241 represents the allowance of the trial interval use. Then, in accordance with software block 243, the file management program monitors and oversees all input and output calls in the data processing system to prevent unauthorized use of the encrypted software products contained on the computer-accessible memory media. In the preferred embodiment of the present invention, the file management program monitors for calls to encrypted files, and then determines whether access should be allowed or denied before the file is passed for further processing. The customer can assess the software product and determine whether he or she desires to purchase it. If a decision is made to purchase the product, the customer must interact once again with the vendor, and the vendor must deliver to the customer a permanent key, as is set forth in step 245. The process ends when the customer receives the permanent key, decrypts the one or more software products that he or she has purchased, and is then allowed ordinary and unrestricted access to the software products.

FIGS. 8, 9, 10a, and 10b depict user interface screens which facilitate trial period operations in accordance with the present invention. FIG. 8 depicts an order form user interface 249 which is displayed when the customer selects a "view order" option from another window. The order form user interface 249 includes a title bar 251 which identifies the software vendor and provides a telephone number to facilitate interaction between the potential customer and the vendor. An order form field 255 is provided which identifies one or more software products which may be examined during a trial interval period of operation. A plurality of subfields are provided including quantity subfield 259, item subfield 257, description subfield 260, and price subfield 253. Delete button 261 allows the potential customer to delete items from the order form field. Subtotal field 263 provides a subtotal of the prices for the ordered software. Payment method icons 265 identify the acceptable forms of payment. Of course, a potential user may utilize the telephone number to directly contact the vendor and purchase one or more software products; alternatively, the user may select one or more software products for a trial period mode of operation, during which a software product is examined to determine its adequacy. A plurality of function icons 267 are provided at the lowermost portion of order form interface 249. These include a close icon, fax icon, mail icon, print icon, unlock icon, and help icon. The user may utilize a graphical pointing device in a conventional point-and-click operation to select one or more of these operations. The fax icon facilitates interaction with the vendor utilizing a facsimile machine or facsimile board. The print icon allows the user to generate a paper archival copy of the interaction with the software vendor.

The customer, the computer-accessible memory media, and the computer system utilized by the customer are identified by media identification 269, customer identification 273, and machine identification 271. The media identification is assigned to the computer-accessible memory media prior to shipping to the potential customer. It is fixed, and cannot be altered. The customer identification 273 is derived from interaction between the potential customer and the vendor. Preferably, the customer provides answers to selected questions in a telephone dialogue, and the vendor supplies a customer identification 273, which is unique to the particular customer. The machine identification 271 is automatically derived utilizing the file management program which is resident on the computer-accessible memory media, and which is unique to the particular data processing system being utilized by the potential customer. The potential customer will provide the machine identification to the vendor, typically through telephone interaction, although fax interaction and regular mail interaction is also possible.

FIG. 9 is a representation of an order form dialog interface 275. This interface facilitates the acquisition of information which uniquely identifies the potential customer, and includes name field 277, address field 279, phone number field 281, facsimile number field 283, payment method field 285, shipping method field 287, account number field 289, expiration date field 291, value added tax ID field 293. Order information dialog interface 275 further includes print button 295 and cancel button 297 which allow the potential user to delete information from these fields, or to print a paper copy of the interface screen.

Figure 10A:
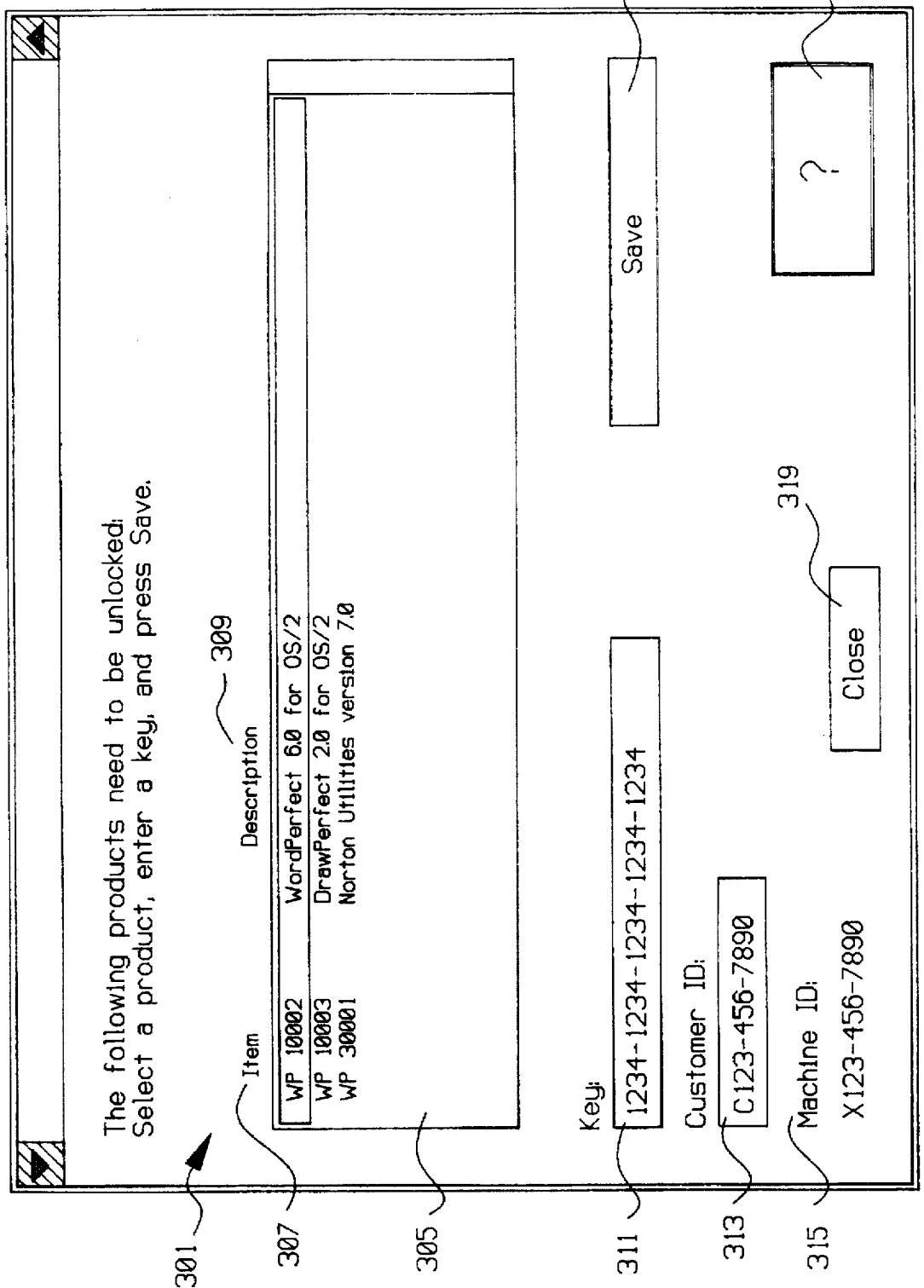
Figure 10B:
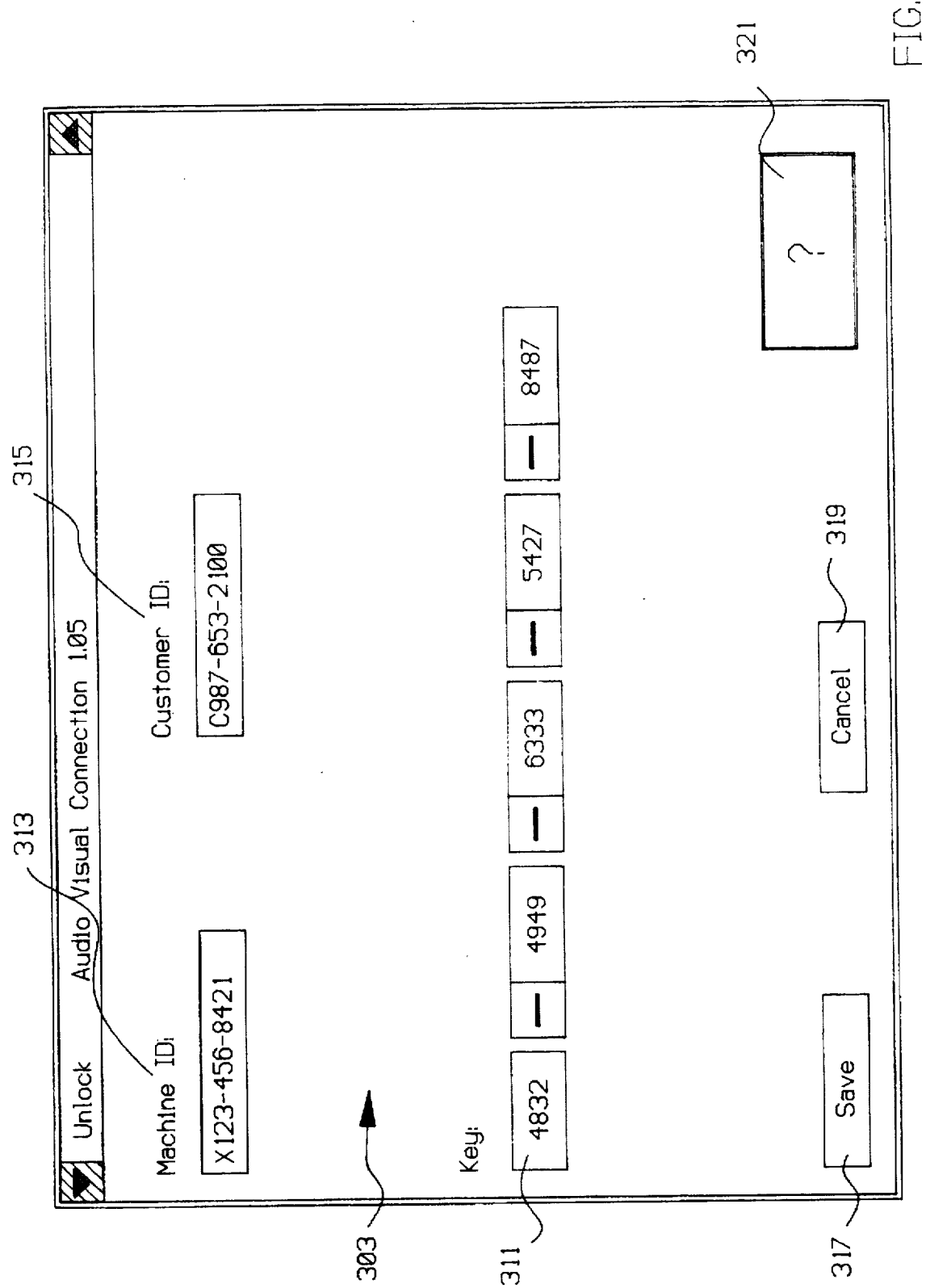

FIGS. 10a and 10b depict unlock dialog interface screens 301, 303. The user utilizes a graphical pointing device to select one or more items which are identified by the content item number field 307 and description field 309 which are components of unlock list 305. The interface further includes customer ID field 313 and machine ID field 315. Preferably, the vendor provides the customer identification to the customer in an interaction via phone, fax, or mail. Preferably, the customer provides to the vendor the machine identification within machine identification field 315 during interaction via phone, fax, or mail. Once the information is exchanged, along with an identification of the products which are requested for a trial interval period of operation, a temporary access key is provided which is located within key field 311. The key will serve to temporarily unlock the products identified and selected by the customer. Close button 319, save button 317, and help button 321 are also provided in this interface screen to facilitate user interaction.

FIG. 10b depicts a single-product unlock interface screen 303. This interface screen includes only machine identification field 315, customer identification field 315, and key field 311. The product which is being unlocked need not be identified in this interface, since the dialog pertains only to a single product, and it is assumed that the user knows the product for which a temporary trial period of operation is being requested. Save button 317, cancel button 319, and help button 321 are also provided in this interface to facilitate operator interaction.

Figure 11:
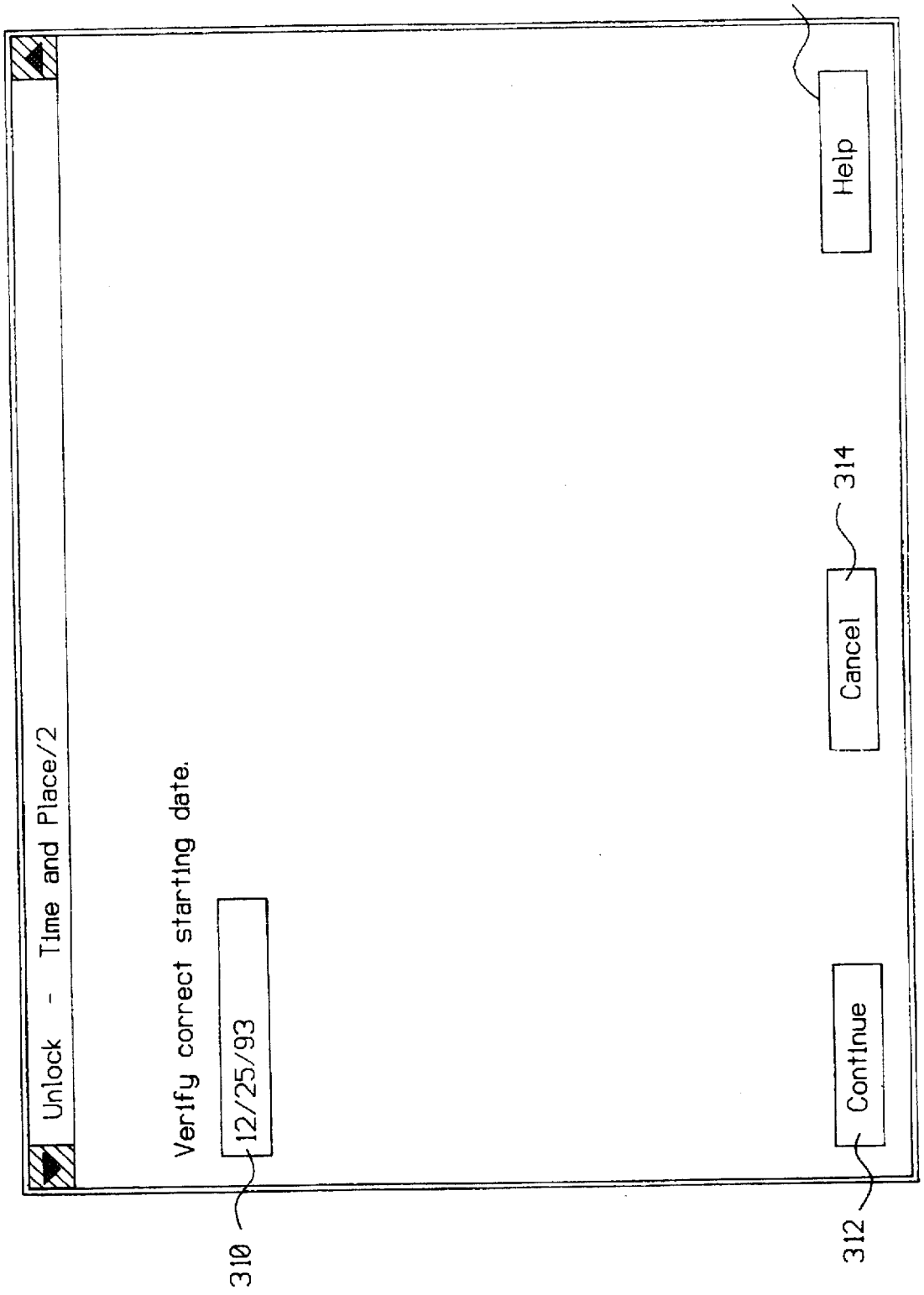
FIG. 11 depicts a user interface which is used to initiate a temporary access key.

FIG. 11 depicts a user interface screen which is utilized in unlocking the one or more encrypted products for the commencement of a trial interval mode of operation. The starting date dialog of FIG. 11 is displayed after the "SAVE" push button is selected in the unlock dialog of either FIG. 10a or FIG. 10b. The user will be prompted to verify the correct starting date which is provided in date field 310. The user responds to the query by pointing and clicking to either the "continue" button 312, the "cancel" button 314, or the "help" button 316. The date displayed in field 310 is derived from the system clock of the user-controlled data processing system. The user may have to modify the system clock to make the date correspond to the official or stated date of commencement of the trial period of operation.

A trial interval operation can take two forms: one form is a functionally disabled product that allows a user to try all the features, but may not allow a critical function like printing or saving of data files. Another type of trial interval is a fully functional product that may be used for a limited time. This requires access protection, and allows a customer to try all the functions of a product for free or for a nominal fee. Typically, in accordance with the present invention, access to the product is controlled through a "timed" key. The trial period for using the product is a fixed duration determined by the vendor. The trial period begins when the key is issued. In accordance with the present invention, the products being previewed during the trial interval of operation can only be run from within a customer shell. A decryption driver will not allow the encrypted products to be copied in the clear, nor will it allow the product to be run outside the customer's shell. In an alternative embodiment, the trial interval is defined by a counter which is incremented or decremented with each "session" the customer has with the product. This may allow the customer a predefined number of uses of the product before decryption is no longer allowed with the temporary key.

The limits of the temporary access key are built into a "control vector" of the key. Typically, a control vector will include a short description of the key, a machine identification number, and a formatted text string that includes the trial interval data (such as a clock value or a counter value). The control vector cannot be altered without breaking the key. When a protected software product is run, the usage data must be updated to enforce the limits of the trial interval period of operation. In order to protect the clock or counter from tampering, its value is recorded in a multiple number of locations, typically in encrypted files. In the preferred embodiment of the present invention, the trial interval information (clock value and/or counter value) is copied to a "key file" which will be described in further detail herebelow, to a machine identification file, which will also be discussed herebelow, and to a system file. When access to an encrypted program is requested, all of these locations are checked to determine if the value for the clock and/or counter is the same. It is unlikely that an average user has the sophistication to tamper successfully with all three files. In the preferred embodiment, a combination of a clock and a counter is utilized to prevent extended use of backup and restore operations to reset the system clock. Although it is possible to reset a PC's clock each time a trial use is requested, this can also be detected by tracking the date/time stamps of certain files on the system and using the most recent date between file date/time stamps and the system clock. As stated above, one of the three locations the timer and/or counter information is stored is a system file. When operating in an OS/2 operating system, the time and usage data can be stored in the system data files, such as the OS2.INI in the OS/2 operating system. The user will have to continuously backup and restore these files to reset the trial and usage data. These files contain other data that is significant to the operation of the user system. The casual user can accidentally lose important data for other applications by restoring these files to an older version. In the present invention, these protection techniques greatly hinder a dishonest user's attempts to extend the trial interval use beyond the authorized interval.

In broad overview, in the present invention, the vendor loads a plurality of encrypted software products onto a computer-accessible memory media, such as a CD ROM or magnetic media diskette. Also loaded onto the computer-accessible memory media is a file management program which performs a plurality of functions, including the function of providing a plurality of user interface screens which facilitate interaction between the software vendor and the software customer. The computer-accessible memory media is loaded onto a user-controlled data processing system, and the file management program is loaded for execution. The file management program provides a plurality of user-interface screens to the software customer which gathers information about the customer (name, address, telephone number, and billing information) and receives the customer selections of the software products for which a trial interval is desired. Information is exchanged between the software vendor card customer, including: a customer identification number, a product identification number, a media identification number, and a machine identification number. The vendor generates the customer identification number in accordance with its own internal record keeping. Preferably, the representative of the software vendor gathers information from the software customer and types this information into a established blank form in order to identify the potential software customer. Alternatively, the software vendor may receive a facsimile or mail transmission of the completed order information dialog interface screen 275 (of FIG. 9). The distributed memory media (such as CDs and diskettes) also include a file management program which is used to generate a unique machine identification based at least in part upon one attribute of the user-controlled data processing system. This machine identification is preferably a random eight-bit number which is created during a one-time setup process. Preferably, eight random bits are generated from a basic random number generator using the system time as the "seed" for the random number generator. Preferably, check bits are added in the final result. Those check bits are critical to the order system because persons taking orders must key in the machine ID that the customer reads over the phone. The check bits allow for instant verification of the machine ID without requiring the customer to repeat the number. Preferably, a master file is maintained on the user-controlled data processing system which contains the clear text of the machine identification and an encrypted version of the machine identification.

When the software customer places an order for a temporary trial use of the software products, he or she verbally gives to the telephone representative of the software vendor the machine identification. In return, the telephone representative gives the software customer a product key which serves as a temporary access key to the encrypted software products on the computer-accessible memory media, as well as a customer identification number. Preferably, the product key is a function of the machine identification, the customer number, the real encryption key for the programs or programs ordered, and a block of control data. The software customer may verify the product key by combining it with the customer number, and an identical block of control data to produce the real encryption key. This key is then used to decrypt an encrypted validation segment, to allow a compare operation. If the encrypted validation segment is identical to known clear text for the validation segment, then the user's file management program has determined that the product key is a good product key and can be utilized for temporary access to the software products. Therefore, if the compare matches, the key is stored on the user-controlled data processing system in a key file. Preferably, the key file contains the product key, a customer key (which is generated from the customer number and an internal key generating key) and a clear ASCII string containing the machine identification. All three items must remain unchanged in order for the decryption tool to derive the real encryption key. To further tie the key file to this particular user-controlled data processing system, the same key file is encrypted with a key that is derived from system parameters. These system parameters may be derived from the configuration of the data processing system.

Stated broadly, in the present invention the temporary key (which is given verbally over the phone, typically) is created from an algorithm that utilizes encryption to combine the real key with a customer number, the machine identification number, and other predefined clear text. Thus, the key is only effective for a single machine: even if the key were to be given to another person, it would not unlock the program on that other person's machine. This allows the software vendor to market software programs by distributing complete programs on computer-accessible memory media such as diskettes or CD ROMs, without significant risk of the loss of licensing revenue.

Some of the preferred unique attributes of the system which may be utilized for encryption operations include the hard disk serial number, the size and format of the hard disk, the system model number, the hardware interface cards, the hardware serial number, and other configuration parameters. The result of this technique is that a machine identification file can only be decrypted on a system which is an identical clone of the user-controlled data processing system. This is very difficult to obtain, since most data processing systems have different configurations, and the configurations can only be matched through considerable effort. These features will be described in detail in the following written description.

Figure 12:
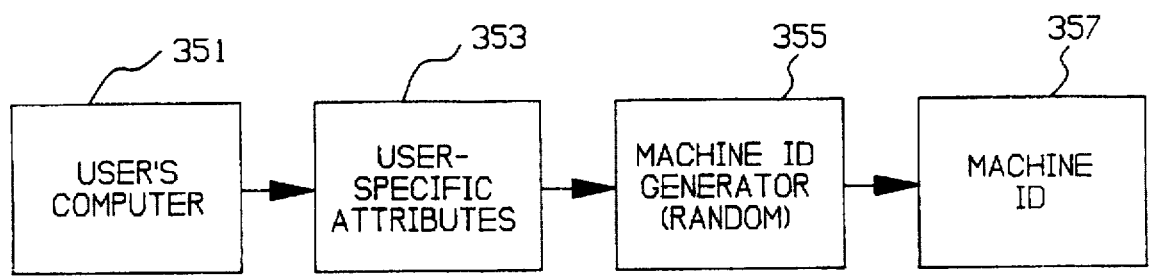
FIG. 12 is a block diagram depiction of the preferred technique of generating a machine identification.

Turning now to FIG. 12, the file management program receives the distributed computer-accessible memory media with encrypted software products and a file management program contained therein. The file management program assesses the configuration of the user-controlled data processing system, as represented in step 351 of FIG. 12. The user-specific attributes of the data processing system are derived in step 353, and provided as an input to machine identification generator 355, which is preferably a random number generator which receives a plurality of binary characters as an input, and generates a pseudo-random output which is representative of machine identification 357. The process employed by machine identification generator 355 is any conventional pseudo-random number generator which receives as an input of binary characters, and produces as an output a plurality of pseudo-random binary characters, in accordance with a predefined algorithm.

Figure 13:
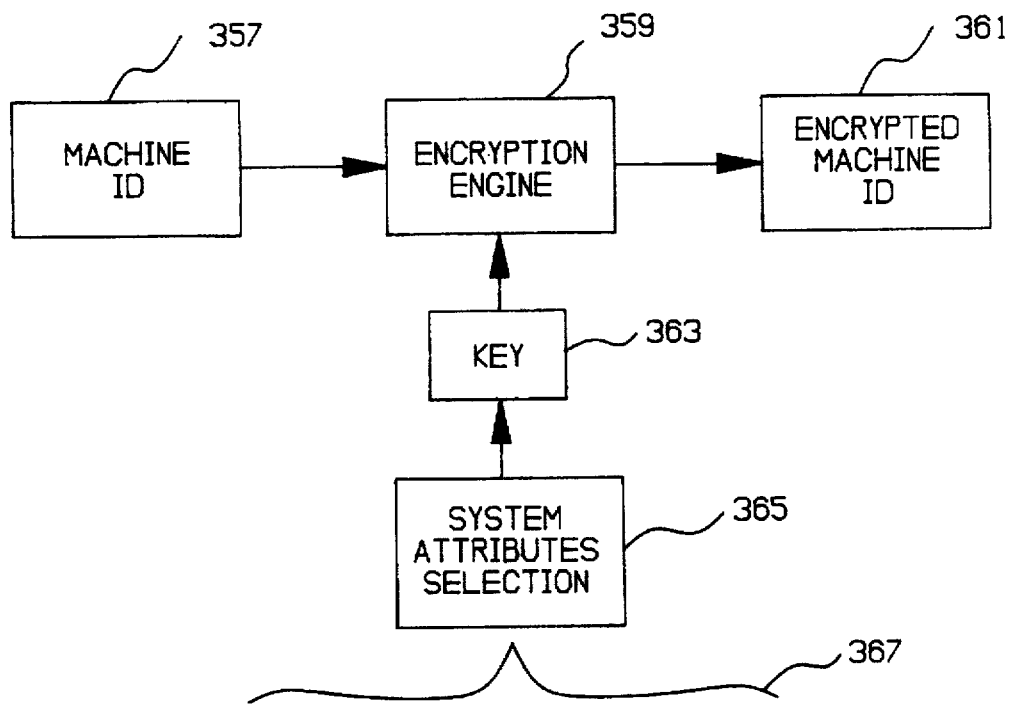
FIG. 13 is a block diagram depiction of an encryption operation which is utilized to encrypt a machine identification, in accordance with the present invention.

With reference now to FIG. 13, machine identification 357 is also maintained within the file management program in an encrypted form. Machine identification 357 is supplied as an input to encryption engine 359 to produce as an output the encrypted machine identification 361. Encryption engine 359 may comprise any convention encryption routine, such as the DES algorithm. A key 363 is provided also as an input to encryption engine 359, and impacts the encryption operation in a conventional manner. Key 363 is derived from system attribute selector 365. The types of system attributes which are candidates for selection include system attribute listing 367 which includes: the hard disk serial number, the size of the hard disk, the format of the hard disk, the system model number, the hardware interface card, the hardware serial number, or other configuration parameters.

Figure 14:
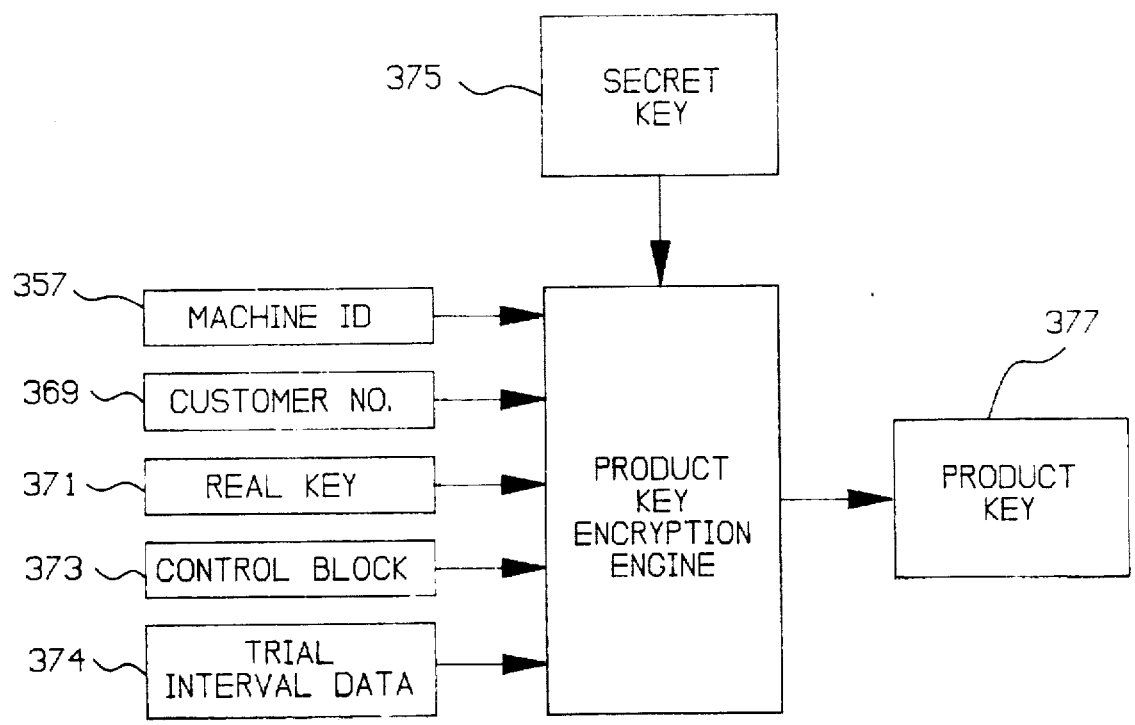
FIG. 14 is a block diagram representation of the preferred technique for generating a product key, in accordance with the present invention.

In accordance with the present invention, the clear text machine identification 357 and the encrypted machine identification 361 are maintained in memory. Also, in accordance with the present invention, the file management program automatically posts the clear text machine identification 357 to the appropriate user interface screens. The user then communicates the machine identification to the software vendor where it is utilized in accordance with the block diagram of FIG. 14. As is shown, product key encryption engine 375 is maintained within the control of the software vendor. This product key encryption engine 375 receives as an input: the machine identification 357, a customer number 369 (which is assigned to the customer in accordance with the internal record keeping of this software vendor), the real encryption key 371 (which is utilized to decrypt the software products maintained on the computer-accessible memory media within the custody of the software customer), a control block text 373 (which can be any predefined textural portion), and trial interval data 374 (such as clock and/or counter value which defines the trial interval of use). Product key encryption engine produces as an output a product key 377. Product key 377 may be communicated to the software customer via an insecure communication channel, without risk of revealing real key 371. Real key 371 is masked by the encryption operation, and since the product key 377 can only be utilized on a data processing system having a configuration identical to that from which machine identification 357 has been derived, access to the encrypted software product is maintained in a secure condition.

Upon delivery of product key 377, the file management program resident in the user-controlled data processing system utilizes real key generator 379 to receive a plurality of inputs, including product key 377, customer number 369, control block text 373, machine identification 357 and trial interval data 374. Real key generator 379 produces as an output the derived real key 381.

Figure 15:
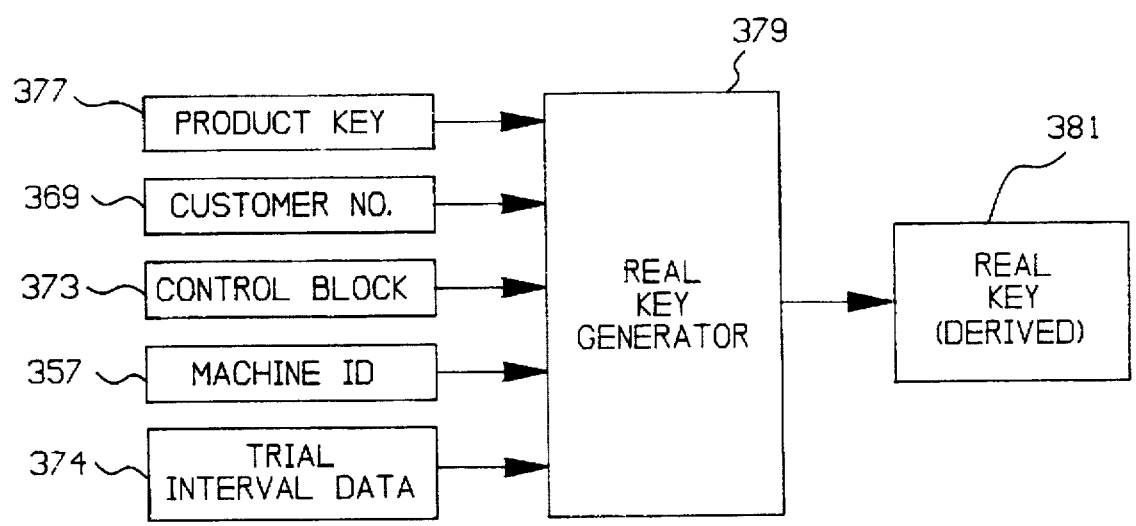
FIG. 15 is a block diagram representation of a preferred technique utilizing a temporary product key to generate a real key which can be utilized to decrypt one or more software objects.

Encryption and decryption algorithm utilized to perform the operations of the product key encryption engine 375 and the real key generator 379 (of FIGS. 14 and 15) is described and claimed in co-pending U.S. patent application Ser. No. 07/964,324, filed Oct. 21, 1992, entitled "Method and System for Multimedia Access Control Enablement", which is incorporated herein as if fully set forth.

Figure 16:
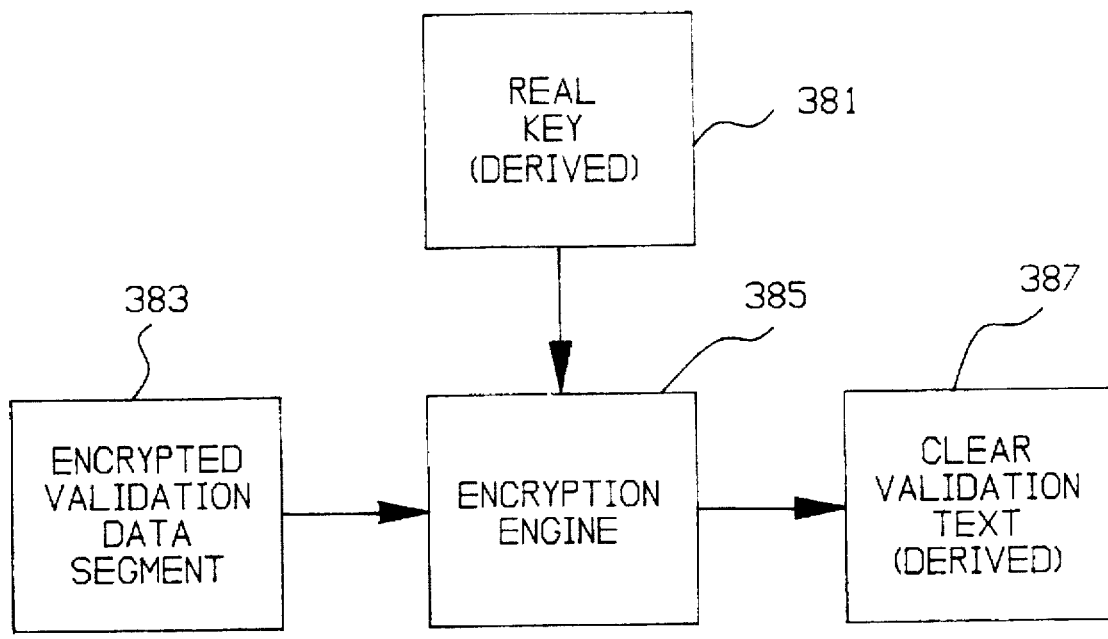
FIGS. 16 and 17 depict a preferred technique of validating the real key which is derived in accordance with the block diagram of FIG. 15.
Figure 17:
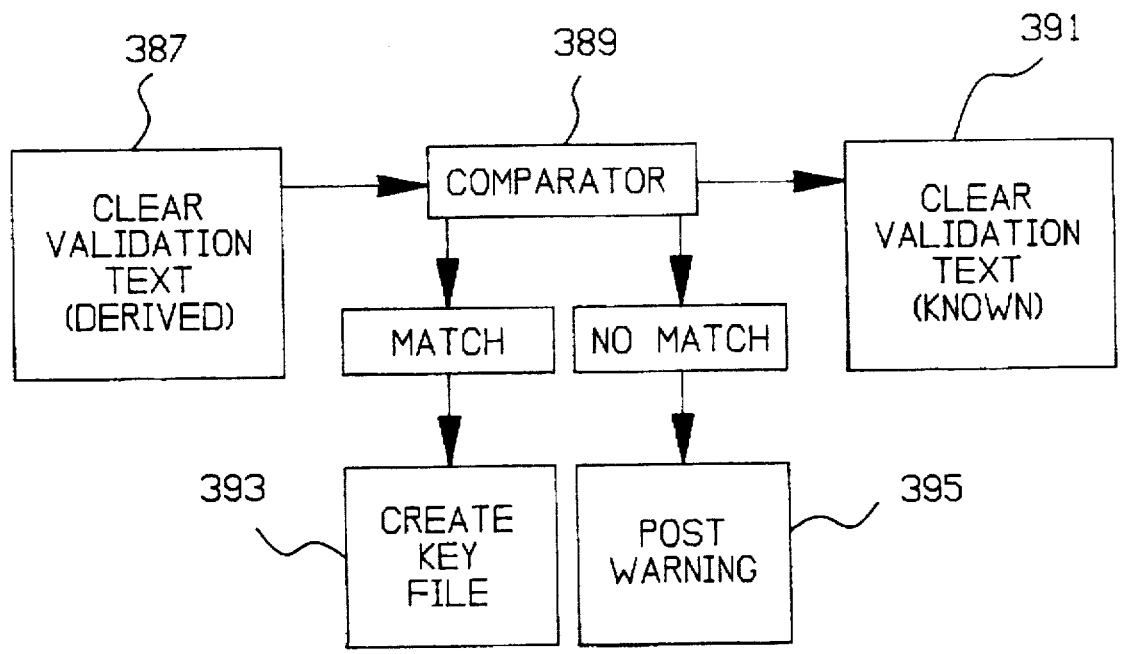

Next, as is depicted in FIGS. 16 and 17, the derived real key 381 is tested to determine the validity and authenticity of the product key 377 which has been provided by the software vendor. As is shown, the derived real key 381 is supplied as an input to encryption engine 385. A predetermined encrypted validation data segment 383 is supplied as the other input to encryption engine 385. Encryption engine supplies as an output derived clear validation text 387. Then, in accordance with FIG. 17, the derived clear validation text 387 is compared to the known clear validation text 391 in comparator 389. Comparator 389 simply performs a bit-by-bit comparison of the derived clear validation text 387 with the known clear validation text 391. If the derived clear validation text 387 matches the known clear validation text 391, a key file is created in accordance with step 393; however, if the derived clear validation text 387 does not match the known clear validation text 391, a warning is posted to the user-controlled data processing system in accordance with step 395.

Figure 18:
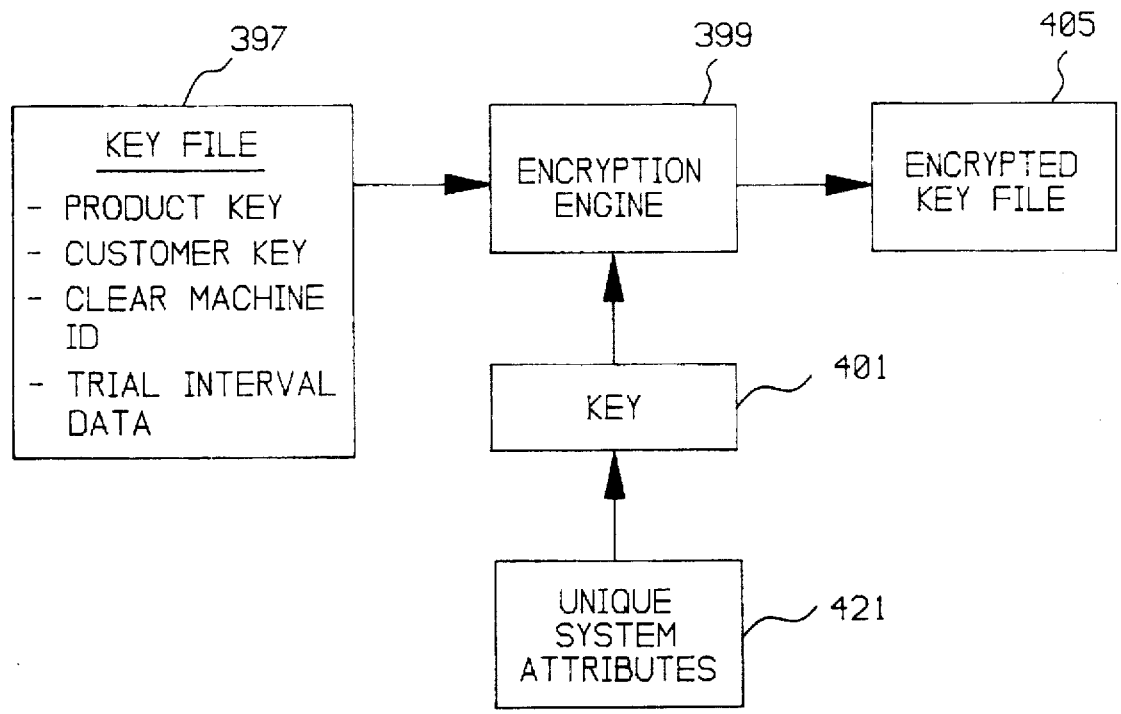
FIG. 18 is a block diagram depiction of the preferred routine for encyrpting a key file which contains information including a temporary product key.

Turning now to FIG. 18, key file 397 is depicted as including the temporary product key, the customer key (which is an encrypted version of the customer number), the machine identification number in clear text and the trial interval data (such as a clock and/or counter value). This key file is supplied as an input to encryption engine 399. Key 401 is also provided as an input to encryption engine 399. Key 401 is derived from unique system attributes 403, such as those system attributes utilized in deriving the machine identification number. Encryption engine 399 provides as an output the encrypted key file 405.

FIGS. 19, 20, 21, 22, and 23 depict operations of the file management program after a temporary access key has been received, and validated, and recorded in key file 397 (of FIG. 18).

Figure 19:
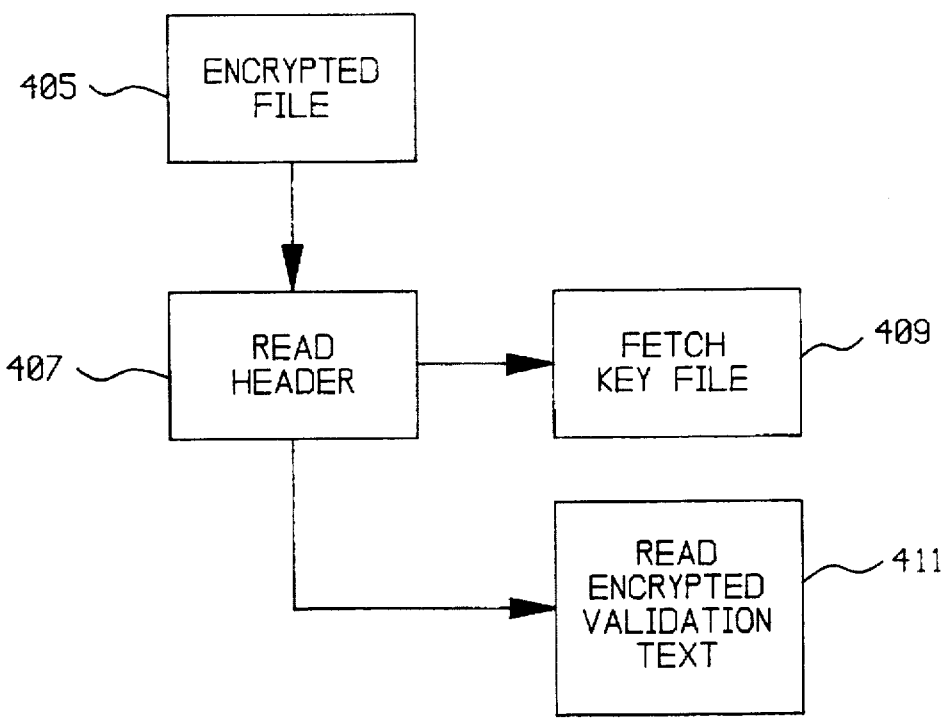
FIG. 19 is a block diagram depiction of the preferred technique of handling an encryption header in an encrypted file, in accordance with the present invention.
Figure 20:
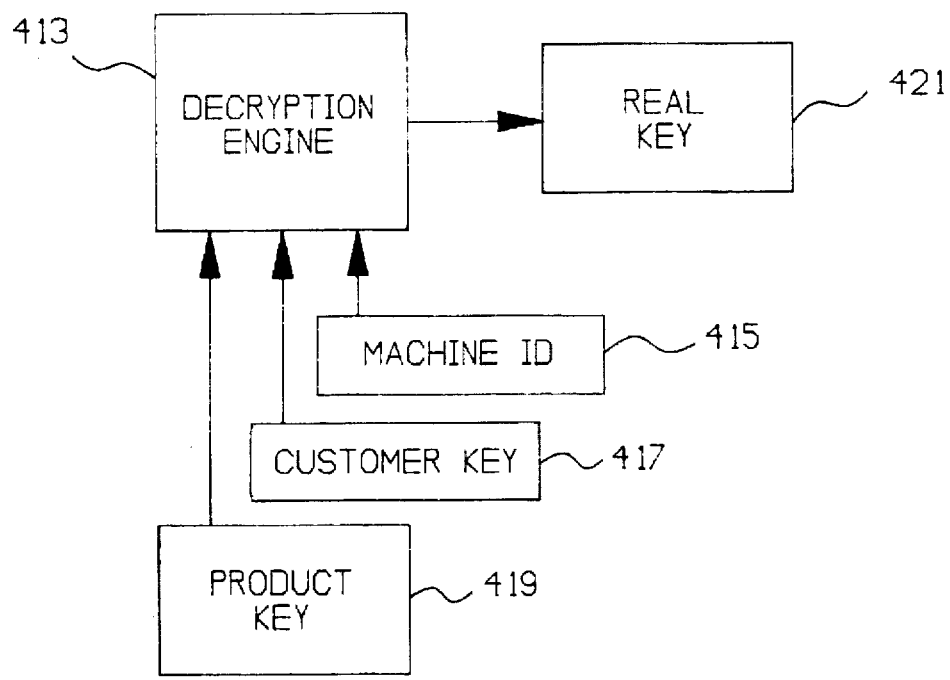
FIG. 20 depicts in block diagram form the technique of utilizing a plurality of inputs in the user-controlled data processing system to derive the real key which may be utilized to decrypt an encrypted software object.
Figure 21:
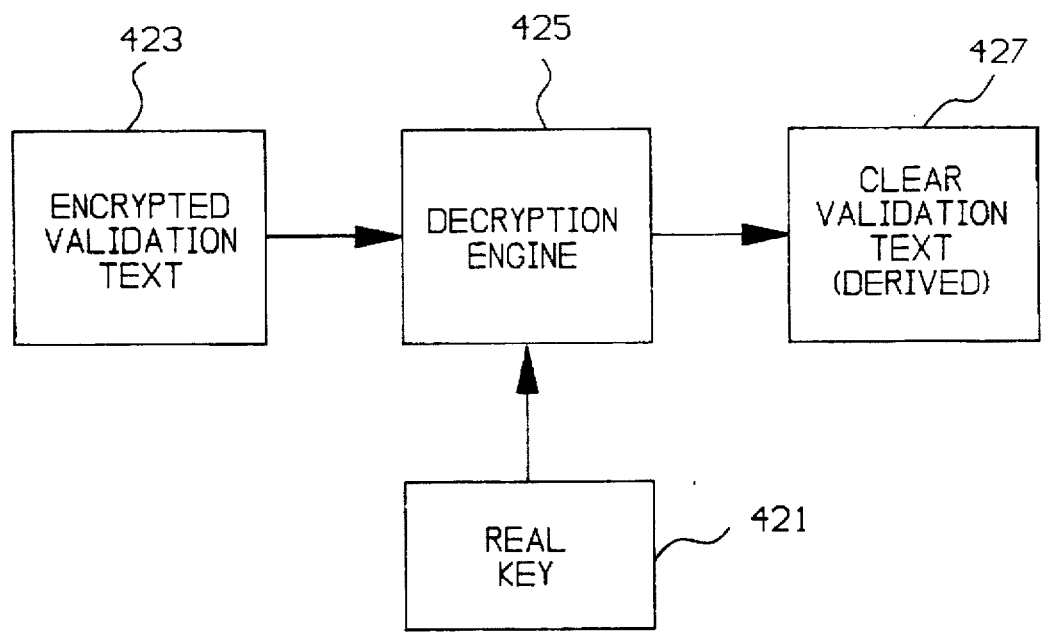
FIG. 21 depicts a decryption operation utilizing the real key derived in accordance with FIG. 20.
Figure 22:
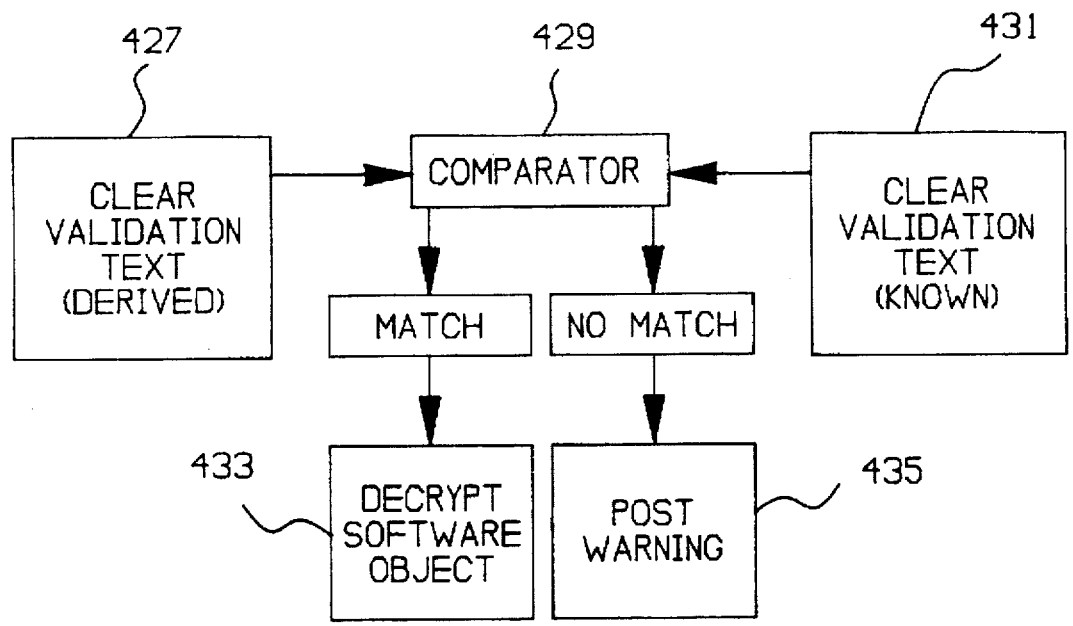
FIG. 22 is a block diagram depiction of a comparison operation which is utilized to determine the validity of the real key.
Figure 23:
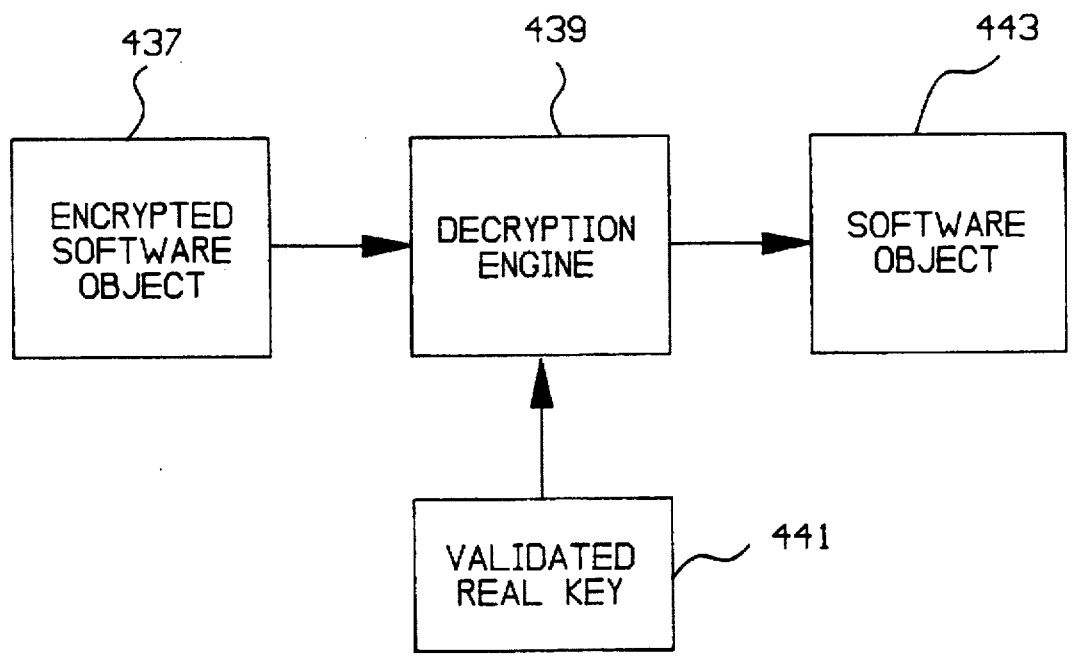
FIG. 23 depicts a decryption operation utilizing a validated real key.

FIG. 19 is a block diagram representation of the steps which are performed when an encrypted software product is called for processing by the user-control data processing system. The encrypted file 405 is fetched, and a "header" portion 407 is read by the user-controlled data processing system. The header has a number of components including the location of the key file. The location of the key file is utilized to fetch the key file in accordance with step 409. The header further includes an encrypted validation text 411. The encrypted validation text 411 is also read by the user-controlled data processing system. As is stated above (and depicted in FIG. 18) the key file includes the product key 419, a customer key 417, and the machine identification 415. These are applied as inputs to decryption engine 413. Decryption engine 413 provides as an output real key 421. Before real key 421 is utilized to decrypt encrypted software products on the distributed memory media, it is tested to determine its validity. FIG. 21 is a block diagram of the validation testing. Encrypted validation text 423, which is contained in the "header", is provided as an input to decryption engine 425. Real key 421 (which was derived in the operation of FIG. 20) is also supplied as an input to decryption engine 425. Decryption engine 425 provides as an output clear validation text 427. As is set forth in block diagram form in FIG. 22, clear validation text 427 is supplied as an input to comparator 429. The known clear validation text 431 is also supplied as an input to comparator 429. Comparator 429 determines whether the derived clear validation text 427 matches the known clear validation text 431. If the texts match, the software object is decrypted in accordance with step 433; however, if the validation text portions do not match, a warning is post in accordance with step 435. FIG. 23 is a block diagram depiction of the decryption operation of step 433 of FIG. 22. The encrypted software object 437 is applied as an input to decryption engine 439. The validated real key 441 is also supplied as an input to decryption engine 439. Decryption engine 439 supplies as an output the decrypted software object 443.

The encryption header is provided to allow for the determination of whether or not a file is encrypted when that file is stored with clear-text files. In providing the encryption header for the encrypted file, it is important that the file size not be altered because the size may be checked as part of a validation step (unrelated in any way to the concept of the present invention) during installation. Therefore, making the file larger than it is suppose to be can create operational difficulties during installation of the software. The encryption header is further necessary since the file names associated with the encrypted software products cannot be modified to reflect the fact that the file is encrypted, because the other software applications that may be accessing the encrypted product will be accessing those files utilizing the original file names. Thus, altering the file name to indicate that the file is encrypted would prevent beneficial and desired communication between the encrypted software product and other, perhaps related, software products. For example, spreadsheet applications can usually port portions of the spreadsheet to a related word processing program to allow the integration of financial information into printed documents. Changing the hard-coded original file name for the word processing program would prevent the beneficial communication between these software products. The encryption header of the present invention resolves these problems by maintaining the encrypted file at its nominal file length, and by maintaining the file name for the software product in an unmodified form.

Figure 24:
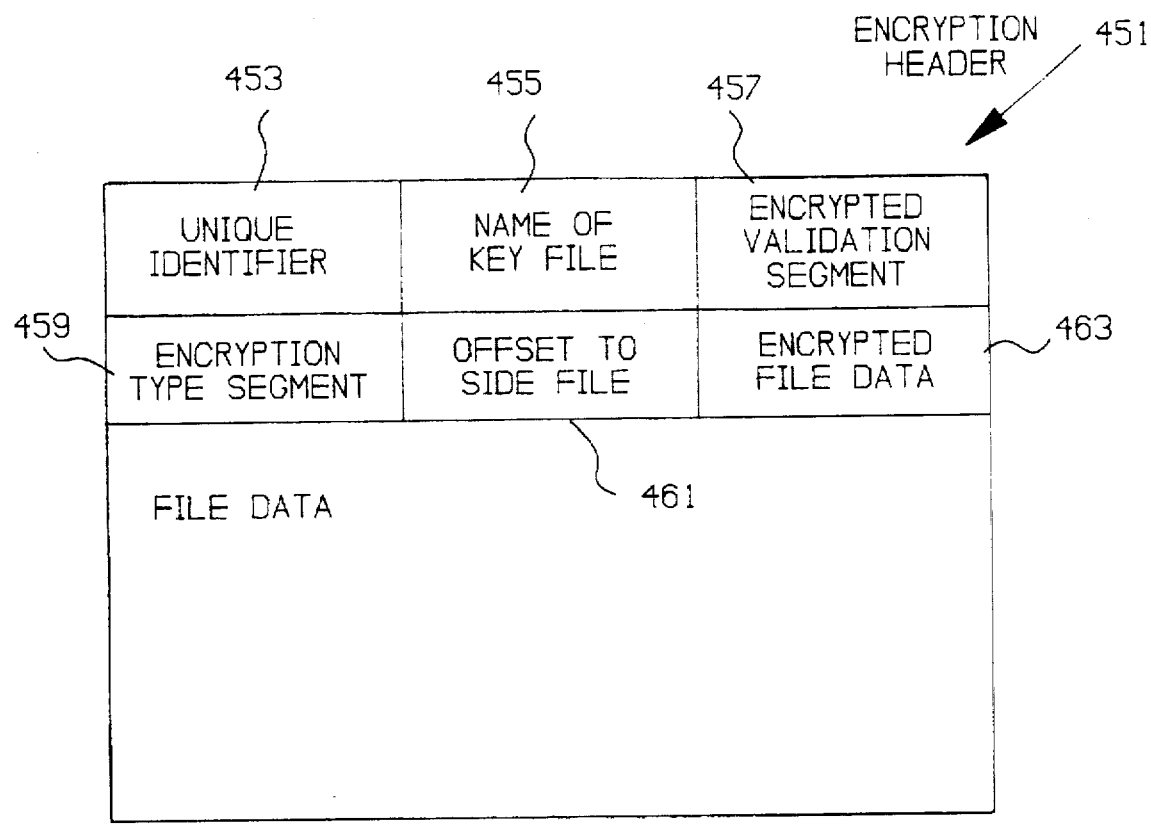
FIGS. 24, 25, 26, 27, 28 depict the utilization of an encryption header in accordance with the present invention.

FIG. 24 graphically depicts an encrypted file with encryption header 451. The encryption header 451 includes a plurality of code segments, including: unique identifier portion 453, the name of the key file portion 455, encrypted validation segment 457, encryption type 459, offset to side file 461, and encrypted file data 463. Of course, in this view, the encrypted file data 463 is representative of the encrypted software product, such as a word processing program or spreadsheet. The encryption header 451 is provided in place of encrypted data which ordinarily would comprise part of the encrypted software product. The encryption header is substituted in the place of the first portion of the encrypted software product. In order to place the encryption header 451 at the front of the encrypted software product of encrypted file data 463, a portion of the encrypted file data must be copied to another location. Offset to side file 461 identifies that side file location where the displaced file data is contained.

Figure 25:
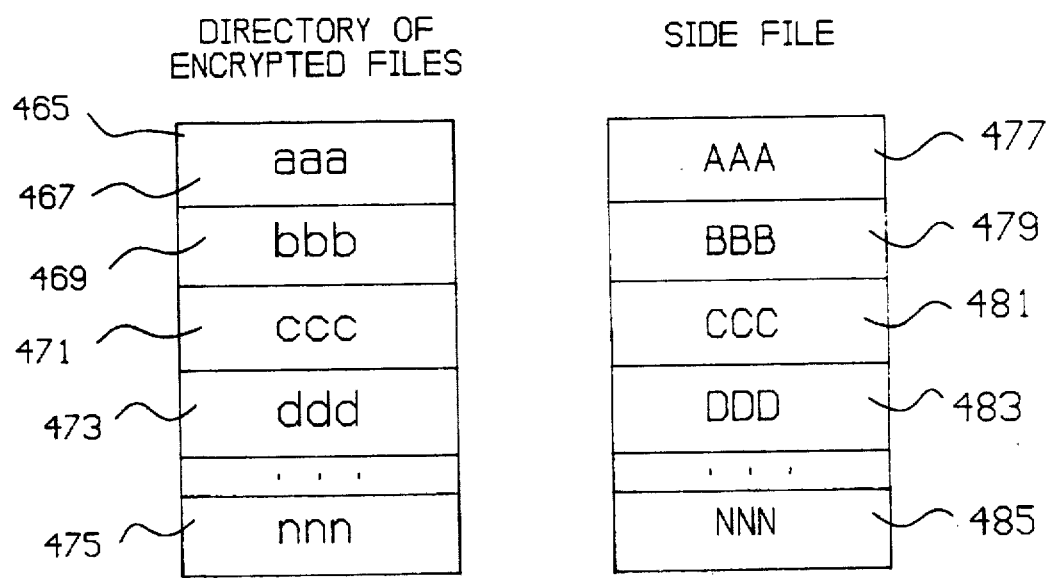

FIG. 25 graphically depicts the relationship between the directory of encrypted files and the side files. As is shown, the directory of encrypted files 465 includes file aaa, file bbb, file ccc, file ddd, through file nnn. Each of these files is representative of a directory name for a particular encrypted software product. Each encrypted software product has associated with it a side file which contains the front portion of the file which has been displaced to accommodate encryption header 451 without altering the size of the file, and without altering the file name. File aaa has associated with it a side file AAA. Software product file bbb has associated with it a side file BBB. Encrypted software product ccc has associated with it a side file CCC. Encrypted software product ddd has associated with it a side file DDD. Encrypted software product nnn has associated with it a side file NNN. In FIG. 25, directory names 467, 469, 471, 473, 475 are depicted as being associated with side files 477, 479, 481, 483, and 485. The purpose of the side files is to allow each of the encrypted software products to be tagged with an encryption header without changing the file size.

Encryption type segment 459 of the encryption header 451 identifies the type of encryption utilized to encrypt the encrypted software product. Any one of a number of conventional encryption techniques can be utilized to encrypt the product, and different encryption types can be utilized to encrypt different software products contained on the same memory media. Encryption type segment 459 ensures that the appropriate encryption/decryption routine is called so that the encrypted software product may be decrypted, provided the temporary access keys are valid and not expired. The name of key file segment 455 of encryption header 451 provides an address (typically a disk drive location) of the key file. As is stated above (in connection with FIG. 18) the key file includes the product key, a customer key, and the clear machine ID. All three of these pieces of information are required in order to generate the real key (in accordance with FIG. 20). Encrypted validation segment 457 includes the encrypted validation text which is utilized in the routine depicted in FIG. 21 which generates a derived clear validation text which may be compared utilizing the routine of FIG. 22 to the known clear validation text. Only if the derived clear validation text exactly matches the known clear validation text can the process continue by utilizing the derived and validated real key to decrypt the encrypted software product in accordance with the routine of FIG. 23. However, prior to performing the decryption operations of FIG. 23, the contents of the corresponding side file must be substituted back into the encrypted software product in lieu of encryption header 451. This ensures that the encrypted software product is complete prior to the commencement of decryption operations.

Each time a file is called for processing by the operating system of the user-controlled data processing system, the file management program which is resident in the operating system intercepts the input/output requests and examines the front portion of the file to determine if a decryption block identifier, such as unique identifier 453, exists at a particular known location. For best performance, as is depicted in FIG. 24, this location will generally be at the beginning of the file. If the file management program determines that the file has the decryption block, the TSR will read the block into memory. The block is then parsed in order to build a fully qualified key file name by copying an environment variable that specifies the drive and directory containing the key files and concatenating the key file name from the encryption block. The TSR then attempts to open the key file. If the key file does not exist, the TSR returns an "access denied" response to the application which is attempting to open the encrypted file. If the key file is determined to exist, the TSR opens the key file and reads in the keys (the product key, the customer key, and the machine identification) and generates the real key. This real key is in use to decrypt the decryption block validation data. As is stated above, a comparison operation determines whether this decryption operation was successful. If the compare fails, the key file is determined to be "invalid", and the TSR returns an "access denied message" to the application which is attempting to open the encrypted software product. However, if the compare is successful, the file management program prepares to decrypt the file according to the encryption type found in the encryption header. The TSR then returns a valid file handle to the calling application to indicate that the file has been opened. When the application reads data from the encrypted file, the TSR reads and decrypts this data before passing it back to the application. If the data requested is part of the displaced data that is stored in the side file, the TSR will read the side file and return the appropriate decrypted block to the calling application without the calling application being aware that the data came from a separate file.

Figure 26:
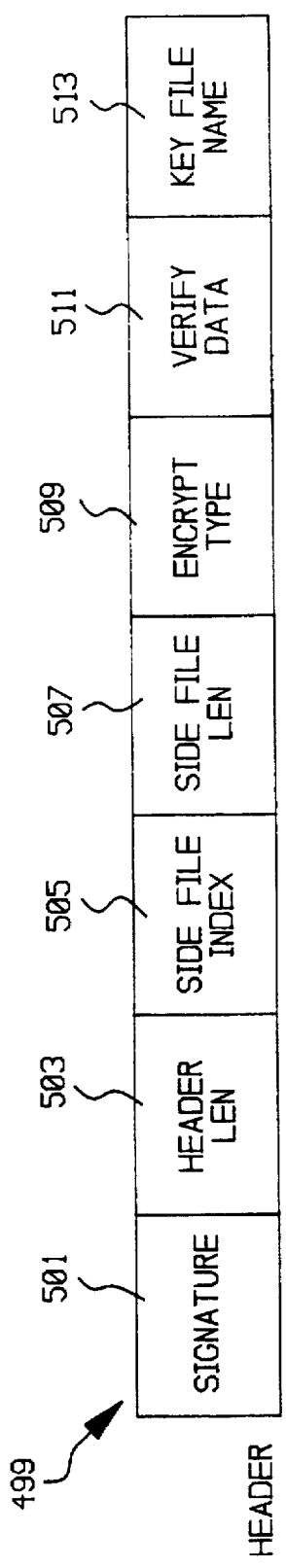
Figure 27:
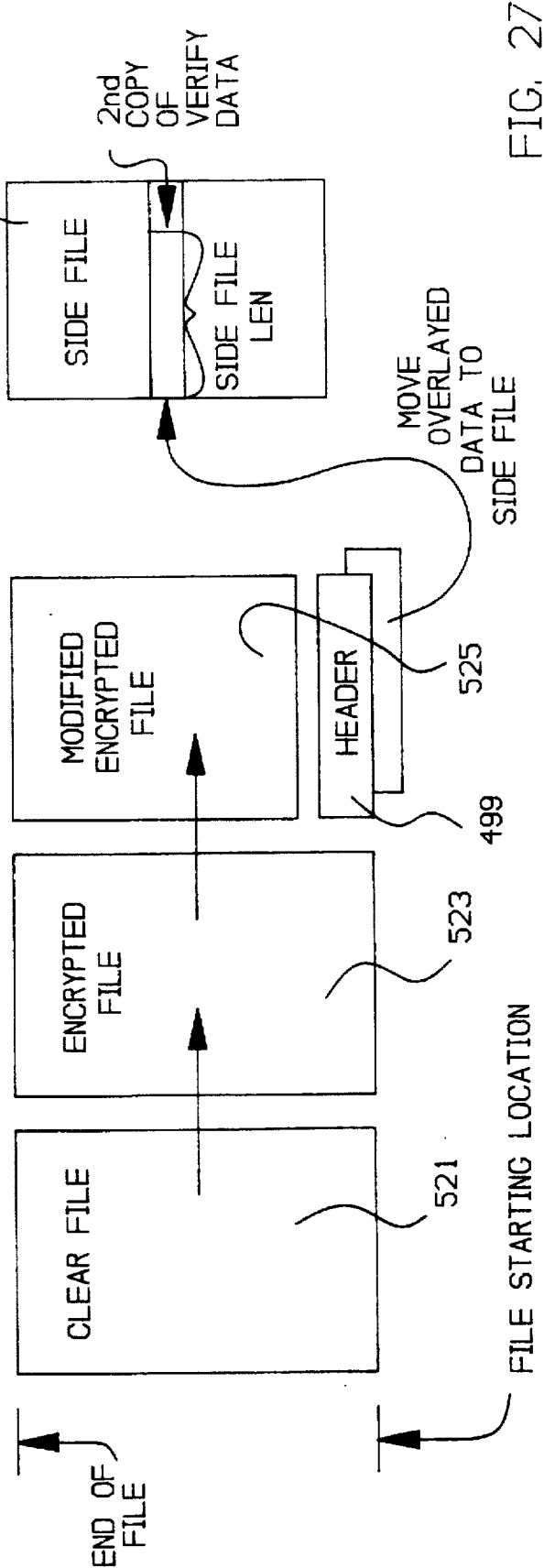
Figure 28:
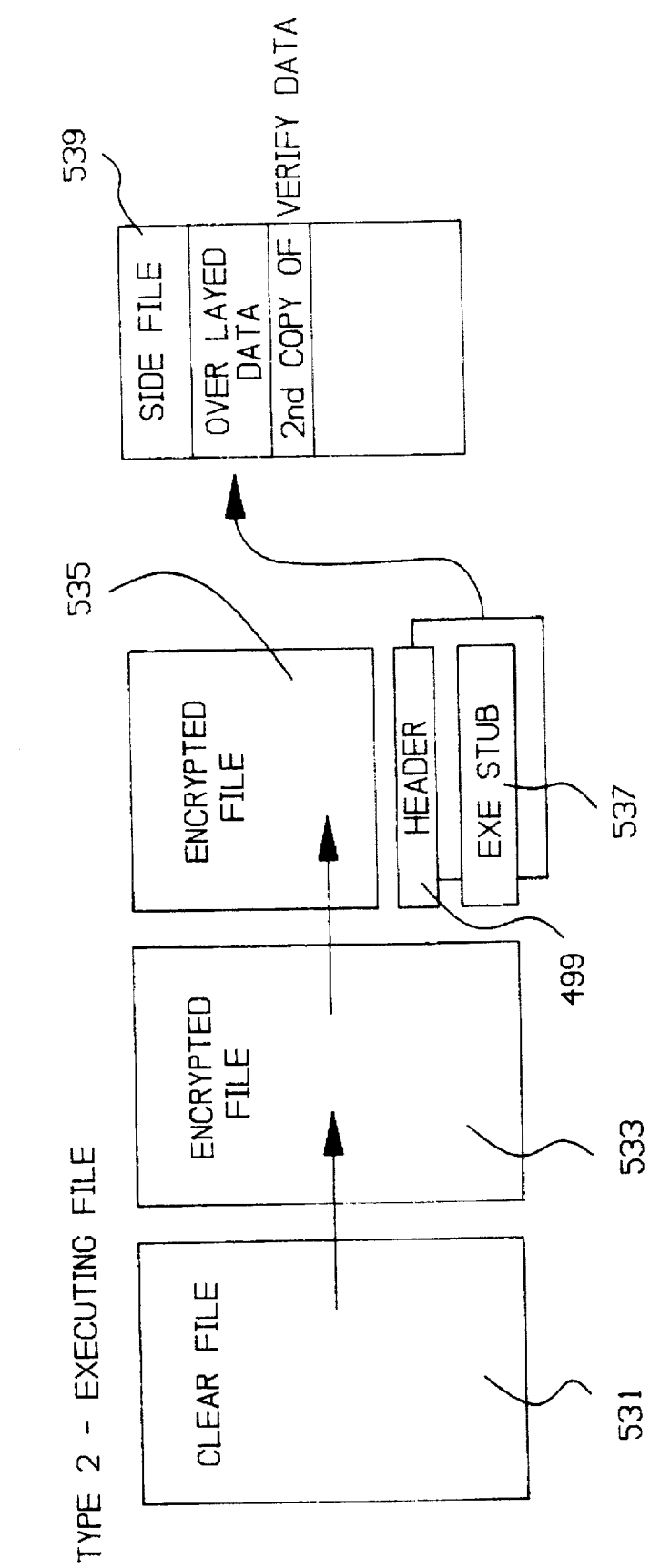

While the broad concepts of the encryption header are depicted in FIGS. 24 and 25, the more particular aspects of creating the encrypted files are depicted in FIGS. 26, 27, and 28. FIGS. 27 and 28 depict two types of data files. FIG. 27 depicts a non-executing data file, while FIG. 28 depicts an executing data file. FIG. 26 depicts a header 499 which includes signature segment 501, header LEN 503, side file index 505, side file LEN 507, decryption type identifier 509, verification data 511, and key file name 518. As is shown in FIG. 27, a software product begins as a clear file 521, and is encrypted in accordance with a particular encryption routine into encrypted file 523. Encryption type segment 509 of header 499 identifies the type of encryption utilized to change clear file 521 to encrypted file 523. Next, the front portion of encrypted file 523 is copied to side file 527 which is identified by side file index 505 and side file LEN 507 of header 499. Additionally, a copy of the clear text of the verification data is also included in side file 527. Then, header 499 is copied to the front portion of encrypted file 523 to form modified encrypted files 525. A similar process is employed for executing files, as depicted in FIG. 28. The clear text copy of the software product (represented as clear file 531) is encrypted in accordance with a conventional routine, to form encrypted file 533. The front portion of encrypted file 533 is copied to side file 539 so that the overlaid data of encrypted file 533 is preserved. Furthermore, side file 539 includes a copy of the clear text of the verification data. Then, the encrypted file 533 is modified by overlaying and executable stub 537 and header 599 onto the first portion of encrypted file 553.

The purpose of executable stub 537 of FIG. 28 will now be described. The DOS operating system for a personal computer will try to execute an encrypted application. This can result in a system "hang" or unfavorable action. The executable stub 357 of the executing file of FIG. 28 is utilized to protect the user from attempting to execute applications that are encrypted: there would be considerable risk that a user would hang his system or format a drive if he or she try to run an encrypted file. The executable stub is attached to the front portion of the encrypted software product so that this stub is executed whenever the application is run without the installed TSR or run from a drive the TSR is not "watching". This stub will post a message to the user that explains why the application cannot run. In addition to providing a message, this executable stub can be used to perform sophisticated actions, such as:

(1) it can duplicate the functionality of the TSR and install dynamic encryption before kicking off the application a second time;

(2) it can turn on a temporary access key and kick off the application a second time;

(3) it can communicate with the TSR and inform it to look at the drive the application is being run from.

The executable stub is saved or copied into the encrypted program as follows:

(1) the application is encrypted;

(2) a decryption block is created for this program;

(3) a pre-built executable stub is attached to the front end of the decryption block;

(4) the length of the combined decryption header and executable stub is determined;

(5) the bytes at the front of the executable file equal to this length are then read into memory, preferably into a predefined side file location; and (6) the encryption header and executable stub are then written over the leading bytes in the executable code.

The TSR can determine if an executable is encrypted by searching beyond the "known size" of the executable stub for the decryption block portion. When the TSR decrypts the executable stub it accesses the side file to read in the bytes that were displaced by the stub and header block.

Figure 29A:
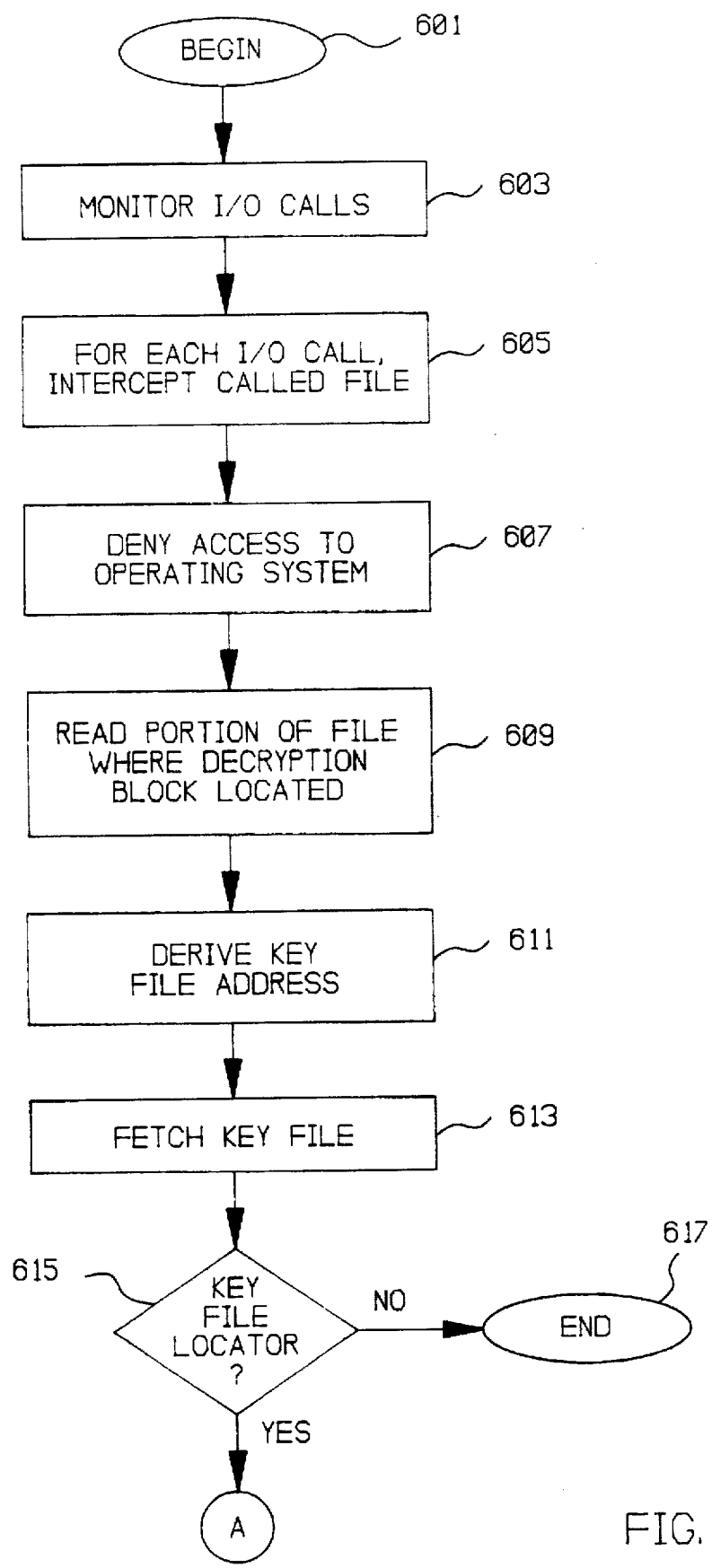
FIG. 29, made up of FIG. 29A and FIG. 29B, is a flowchart representation of the preferred technique of providing a trial period of use for an encrypted software object.
Figure 29B:
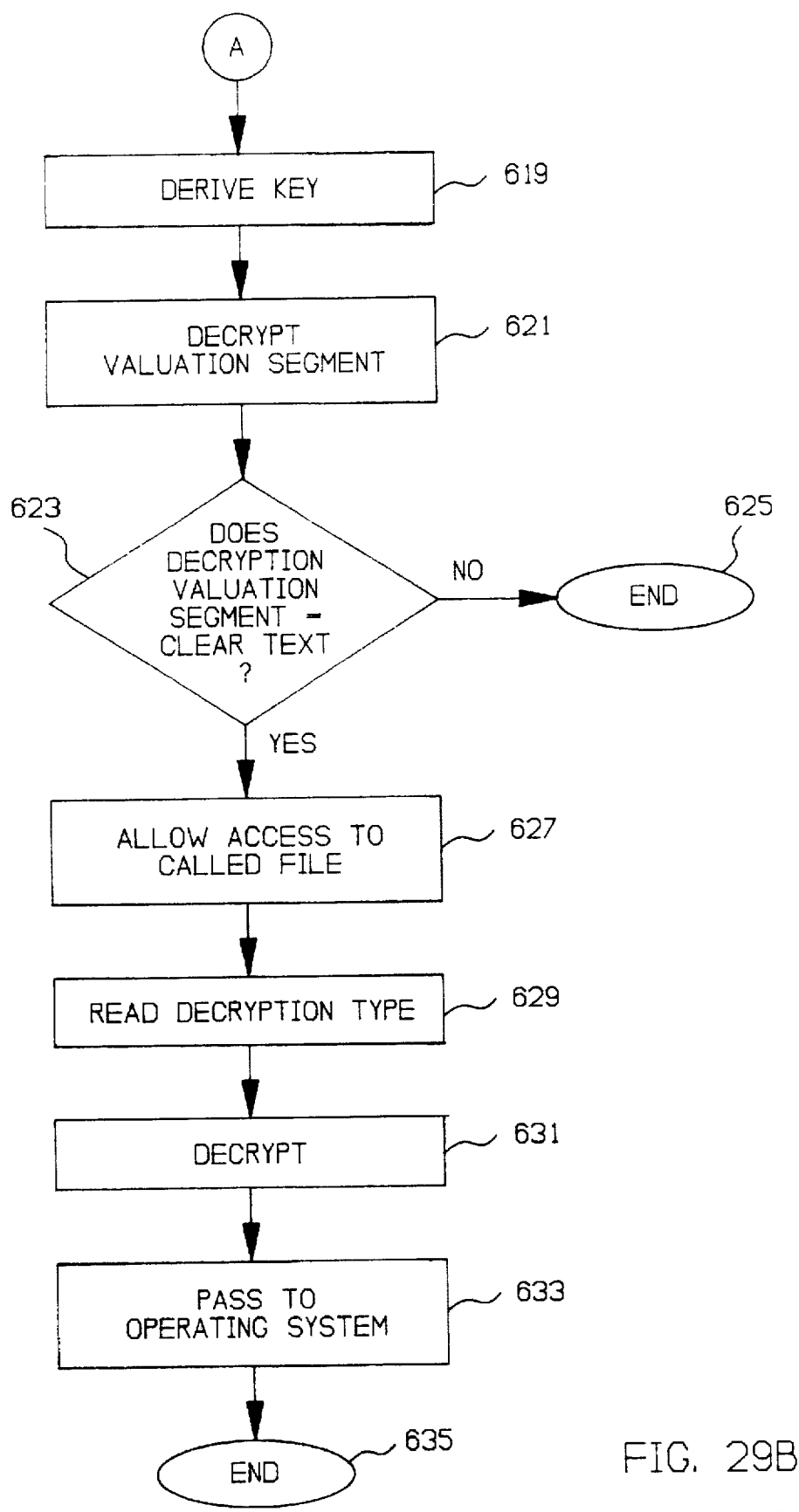

FIG. 29 provides a flowchart representation of operation during a trial period interval, which begins at software block 601. In accordance with software block 603, the file management program located in the operating system of the user-controlled data processing system continually monitors for input/output calls to the memory media. Then, in accordance with software block 605, for each input/output call, the called file is intercepted, and in accordance with software block 607 the operating system is denied access to the called file, until the file management program can determine whether access should be allowed or not. A portion of the called file is read where the decryption block should be located. This portion of the called file is then read, in accordance with software block 609, to derive a key file address in accordance with software block 611. The address which is derived is utilized to fetch the key file, in accordance with software block 613. In accordance with decision block 615, if the key file cannot be located, the process ends at software block 617; however, if it is determined in decision block 615 that the key file can be located, the key is derived in accordance with software block 619. The derived key is then utilized to decrypt the validation segment which is located within the encryption header, in accordance with software block 621. In decision block 623, the decryption validation segment is compared to the clear text for the decryption validation segment; if it is determined that the decrypted segment does not match the known clear text segment, the process continues at software block 625 by ending; however, if it is determined in decision block 623 that the decrypted validation segment does match the known clear text validation segment, the process continues as software block 627, wherein access to the called file is allowed. Then, the decryption type is read from the decryption header in accordance with software block 629, and the called file is dynamically decrypted in accordance with software block 631 as it is passed for processing by the operating system of the user-controlled data processing system, in accordance with software block 633. The process terminates at software block 635.

If unauthorized execution of an encrypted file is attempted, the executable stub will at least temporarily deny access and post a message to the system, but may handle the problem in a number of sophisticated ways which were enumerated above.

In accordance with the preferred embodiment of the present invention, during the trial interval, or at the conclusion of the trial interval, the prospective purchaser may contact the vendor to make arrangements for the purchase of a copy of the one or more software products on the computer-accessible memory media. Preferably, CD ROMs or floppy disks have been utilized to ship the product to the potential user. Preferably, the computer-accessible memory media includes the two encrypted copies of each of the products which are offered for a trial interval of use. One encrypted copy may be decrypted utilizing the file management program and the temporary key which is communicated from the vendor to the purchaser. The other encrypted copy is not provided for use in the trial interval mode of operation, but instead is provided as the permanent copy which may be decrypted and utilized once the software product has been purchased. In broad overview, the user selects a software product for a trial interval mode of operation, and obtains from the vendor temporary access keys, which allow the user access to the product (through the file management program) for a predefined trial interval. Before or after the conclusion of the trial interval, the user may purchase a permanent copy of the software product from the vendor by contacting the vendor by facsimile, electronic mail, or telephone. Once payment is received, the vendor communicates to the user a permanent access key which is utilized to decrypt the second encrypted copy of the software product. This encrypted product may be encrypted utilizing any conventional encryption routine, such as the DES algorithm. The permanent key allows the software product to be decrypted for unrestricted use. Since multiple copies of the product may be purchased in one transaction, the present invention is equipped with a technique for providing movable access keys, which will be discussed below in connection with FIGS. 30 through 35. In the preferred embodiment of the present invention, the encryption algorithm employed to encrypt and decrypt the second copy of the software product is similar to that employed in the trial interval mode of operation.

The present invention includes an export/import function which allows for the distribution of permanent access keys, after the conclusion of a trial interval period. Typically, an office administrator or data processing system manager will purchase a selected number of "copies" of the encrypted product after termination of a trial interval period. Certain individuals within the organization will then be issued permanent keys which allow for the unrestricted and permanent access to the encrypted product. In an office or work environment where the computing devices are not connected in a distributed data processing network, the permanent access keys must be communicated from the office administrator or data processing manager to the selected individuals within an organization who are going to receive copies of the encrypted software product. The permanent keys allow for permanent access to the product. Since not all employees within an organization may be issued copies of the particular encrypted product, the vendor would like to have the distribution occur in a manner which minimizes or prevents the distribution beyond the sales agreement or license agreement. Since the products are encrypted, they may be liberally distributed in their encrypted form. It is the keys which allow unrestricted access to the product which are to be protected in the current invention. To prevent the distribution of keys on electronic mail or printed communications, the present invention includes an export program which is resident in a source computer and an import program which is resident in a target computer which allow for the distribution of the access keys via a removable memory media, such as a floppy diskette. This ensures that the access keys are not subject to inadvertent or accidental distribution or disclosure. There are two principal embodiments which accomplish this goal.

In the first embodiment, one or more encrypted files which are maintained in the source computer are first decrypted, and then encrypted utilizing an encryption algorithm and an encryption key which is unique to the transportable memory media (such as a diskette serial number). The key file may then be physically carried via the diskette to a target computer, where it is decrypted utilizing a key which is derived by the target computer from interaction with the transferable memory media. Immediately, the key file or files are then encrypted utilizing an encryption operation which is keyed with a key which is derived from a unique system attribute of the target computer.

In the alternative embodiment, the transferrable memory media is loaded onto the target computer to obtain from the target computer import file a transfer key which is uniquely associated with the target computer, and which may be derived from one or more unique system attributes of the target computer. The memory media is then transferred to the source computer, where the one or more key files are decrypted, and then encrypted utilizing the transfer key. The memory media is then carried to the target computer where the transfer key is generated and utilized in a decryption operation to decrypt the one or more key files. Preferably, immediately the key files are encrypted utilizing an encryption operation which is keyed with a key which is uniquely associated with the target computer, and which may be derived from one or more unique computer configuration attributes. The first embodiment is discussed herein in connection with FIGS. 30, 31, 32, and 33. The second embodiment is discussed in connection with FIGS. 34 and 35.

Figure 30:
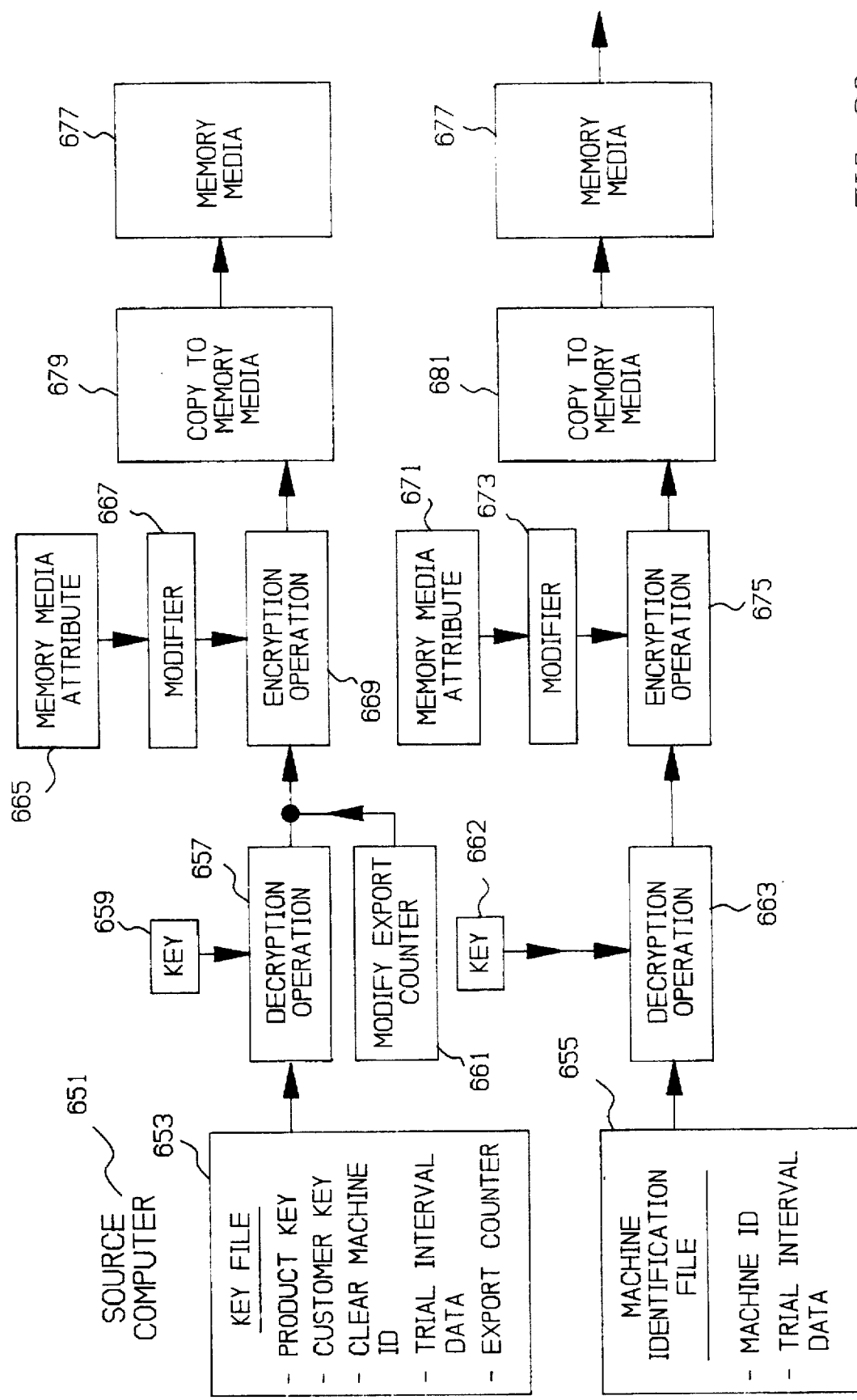
FIGS. 30 and 31 depict export and import operations which may be utilized to perform trial period use operations in a distributed data processing system.
Figure 31:
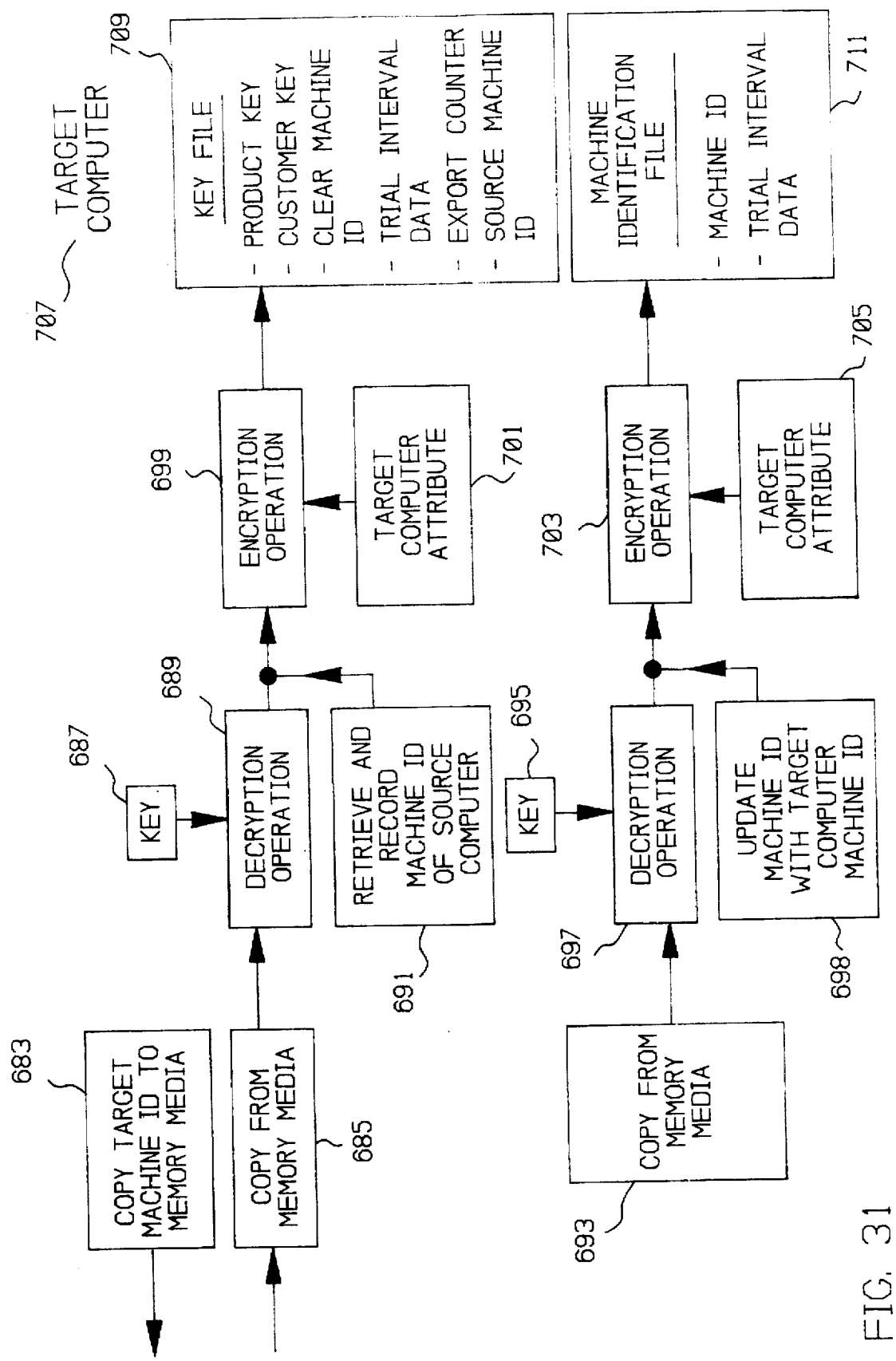

FIGS. 30 and 31 depict in block diagram form export and import operations which allow an authorized user to move his permanent key to another data processing system using an "export" facility that produces a unique diskette image of the access key that has been enabled for import into another system. In accordance with the present invention, the access keys which are delivered over the telephone by the software vendor to the customer are less than 40 bytes in length. The key file that is produced is over 2,000 bytes in length. An export facility is provided for copying the key file and the machine identification file to a diskette. Both files are then encrypted with a modified diskette serial number to inhibit these files from being copied to a public forum where anyone could use them. An import facility provided in another system decrypts these files and adds the product key and machine identification from the diskette to a list of import product keys and machine identifications in the import systems master file, and copies the key file to the import system hard disk. The key file is encrypted on the import system as is disclosed above.

FIG. 30 is a block diagram depiction of an export operation in accordance with the preferred embodiment of the present invention. As is shown, source computer 651 includes a key file 653 and a machine identification file 655. Key file 653 includes the product key, the customer key, the clear text of the machine identification for source computer 653, trial interval data (such as a clock and/or counter which define the trial interval period), and an export counter which performs the dual functions of defining the maximum number of export operations allowed for the particular protected software products and keeping track of the total number of export operations which have been accomplished. The machine identification file includes the machine identification number and trial interval data (such as a clock and/or counter which defines the trial interval period). Both key file 653 and machine identification file 655 are encrypted with any conventional encryption operation (such as the DES algorithm), which is keyed with a key which is derived from a unique system attribute of source computer 651. At the commencement of an export operation, key file 653 and machine identification file 655 are decrypted. Key file 653 is supplied as an input to decryption operation 657 which is keyed with key 659. Likewise, machine identification file 655 is supplied as an input to decryption operation 663 which is keyed with key 661. Decryption operations 657, 663 generate a clear text version of key file 653 and machine identification file 655. Once the clear text is obtained, the export counter which is contained within key file 653 is modified in accordance with block 661. For example, if this is the seventh permitted export operation out of ten permissible operations, the counter might read "7:10". The clear text version of key file 653 is supplied as an input to encryption operation 669. Encryption operation 669 may be any conventional encryption operation (such as the DES algorithm), which is keyed with a memory media attribute 665 which is unique to a memory media which is coupled to source computer 651, which has been subjected to modification of modifier 667. For example, a unique diskette serial number may be supplied as the "memory media attribute" which is unique to memory media 677. The diskette serial number is modified in accordance with modifier 667 to alter it slightly, and supply it as an input to encryption operations 669. The same operation is performed for the clear text of machine identification file 655. A unique memory media attribute 671 is modified by modifier 673 and utilized as a key for encryption operation 675, which may comprise any conventional encryption operation, such as the DES operation. Finally, the output of encryption operations 669 and 675 are supplied as inputs to copy operations 679, 681 which copy the encrypted key file 653 and machine identification file 655 to memory media 677.

FIG. 31 is a block diagram depiction of an import operation. Memory media 677 (of FIG. 30) is physically removed from source computer 651 (of FIG. 30) and physically carried over to computer 707 (of FIG. 31); alternatively, in a distributed data processing system, this transfer may occur without the physical removal of memory media 677. With reference now to FIG. 31, in accordance with block 683, the machine identification of the target machine is copied to memory media 677 to maintain a record of which particular target computer received the key file and machine identification file. Then, in accordance with blocks 685, 693 the encrypted key file 653 and machine identification file 655 are copied from the memory media to target computer 707. The encrypted key file 653 is supplied as an input to decryption operation 689 which is keyed with key 687. Decryption operation 689 reverses the encryption operation of block 669, and provides as an output a clear text version of key file 653. Likewise, machine identification file 655 is supplied as an input to decryption operation 697, which is keyed with key 695. Decryption operation 697 reverses the encryption of encryption operation 675 and provides as an output the clear text of machine identification file 655. In accordance with block 691, the machine identification of the source computer 651 is retrieved and recorded in memory in the clear text of key file 653. Next, the clear text of key file 653 is supplied as an input to encryption operation 699. Encryption operation 699 is a conventional encryption operation, such as the DES operation, which is keyed with a target computer unique attribute, such as the machine identification or modified machine identification for the target computer 707. The clear text of machine identification file 655 is supplied as an input to encryption operation 703. Encryption operation 703 is any conventional encryption operation, such as the DES encryption operation, which is keyed with a unique target computer attribute 705, such as machine identification or modified machine identification of target computer 707. The output of encryption operation 699 produces an encrypted key file 709 which includes a product key (which is the same temporary product key of key file 653 of source computer 651), a customer number (which is the same customer number of key file 653 of source computer 651), and clear machine identification (which is the machine identification for target computer 707, and not that of source computer 651), trial interval data (which is identical to the trail interval data of key file 653 of source 651), and an identification of the machine identification of the source computer 651. The output of encryption operation 703 defines machine identification file 711, which includes the machine identification of the target computer 707 (and not that of the source computer 651), and the trial interval data (which is identical to that of machine identification file 655 of source computer 651).

Figure 32:
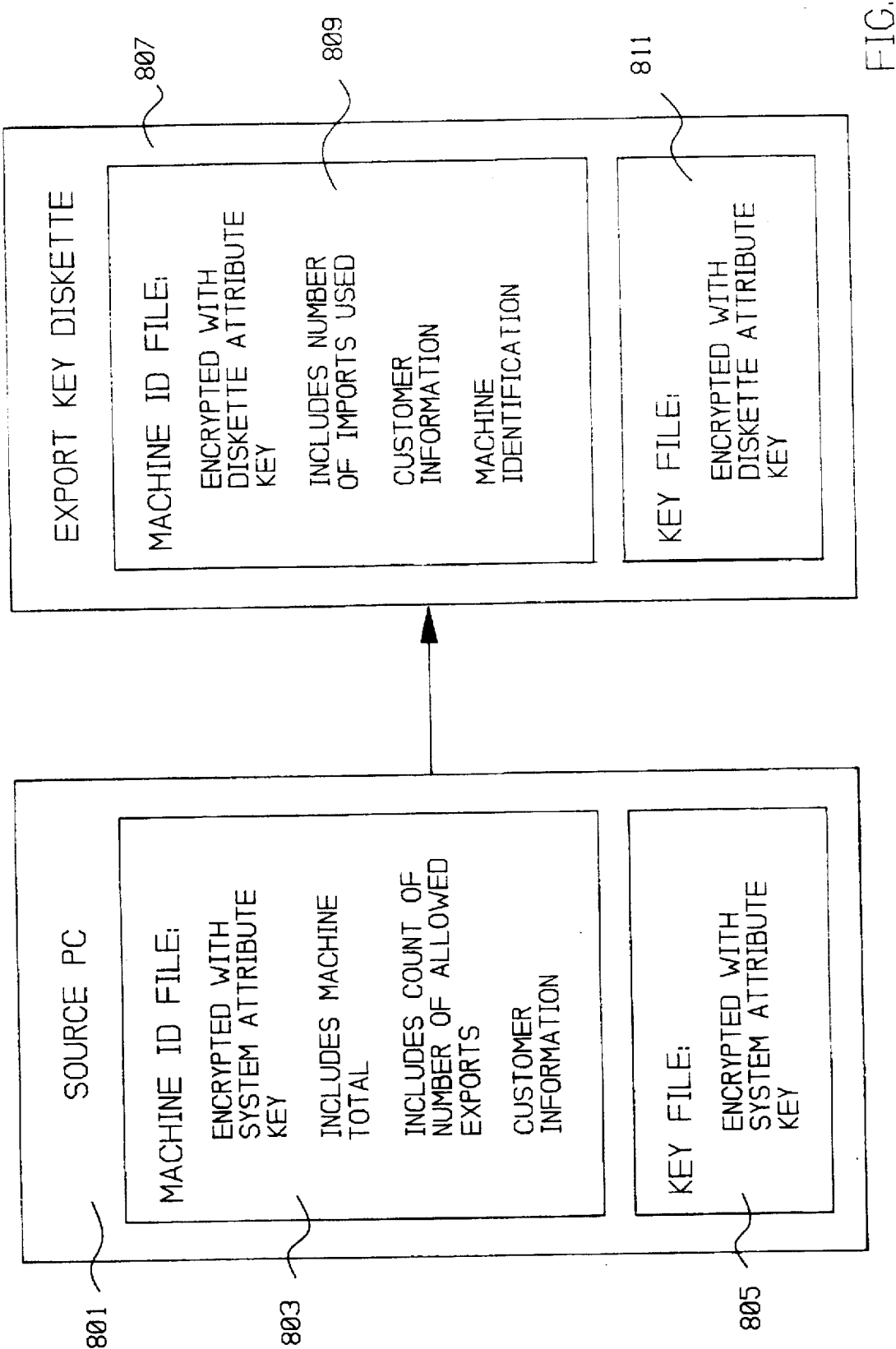
FIGS. 32 and 33 provide an alternative view of the import and export operations which are depicted in FIGS. 30 and 31.
Figure 33:
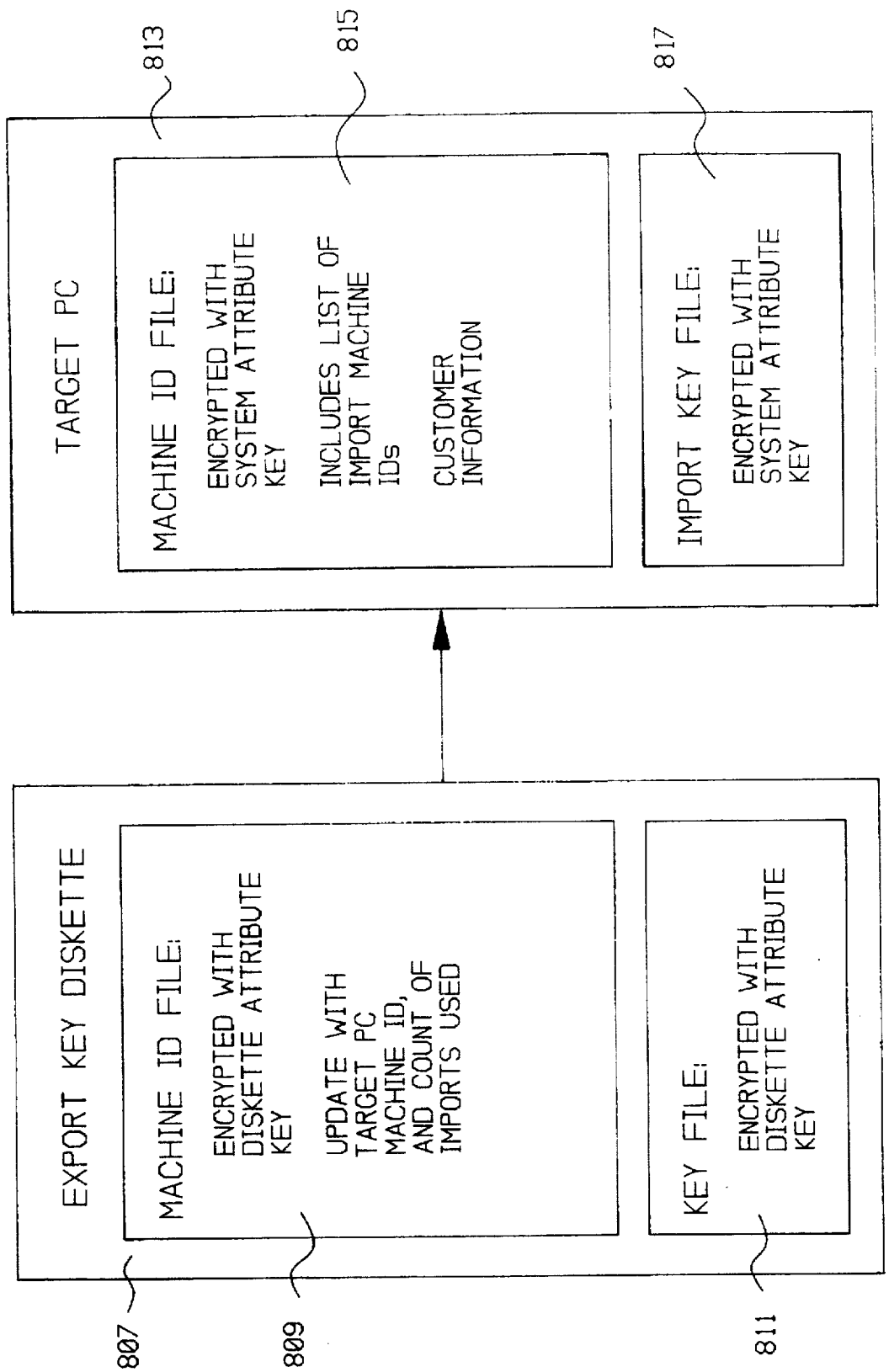

FIGS. 32 and 33 provide alternative views of the import and export operations which are depicted in FIGS. 30 and 31, and emphasize several of the important features of the present invention. As is shown, source computer 801 includes machine identification file 803 which is encrypted with a system attribute key which is unique to the source computer 801. The machine identification file includes machine identification file number as well as count of the number of exports allowed for each protected software product, and a count of the total number of exports which have been utilized. For example, the first export operation carries a count of "1:10", which signifies that one export operation of ten permitted export operations has occurred. In the next export operation, the counter is incremented to "2:20" which signifies that two of the total number of ten permitted export operations has occurred. Each target computer which receives the results of the export operation is tagged with this particular counter value, to identify that it is the recipient of a particular export operation. For example, one source computer system may carry a counter value of "1:10", which signifies that it is the recipient of the first export operation of ten permitted export operations. Yet another target computer may carry the counter value of "7:10", which signifies that this particular target computer received the seventh export operation of a total of ten permitted export operations. In this fashion, the target computer maintains a count of a total number of used export operations, while the source computers each carry a different counter value which identifies it a the recipient of the machine identification file and key file from the source computer from particular ones of the plurality of permitted export operations.

Note that in source computer 801 machine identification file 803 and key file 805 are encrypted with an encryption algorithm which utilizes as a key a system attribute which is unique to source computer 801; however, once machine identification file 803 and key file 805 are transferred to a memory media, such as export key diskette 807, machine identification file 809 and key file 811 are encrypted in any conventional encryption operation which utilizes as an encryption key a unique diskette attribute, such as the diskette's serial number. This minimizes the possibility that the content of the machine ID file 809 and/or key file 811 can be copied to another diskette or other memory media and then utilized to obtain unauthorized access to the software products. This is so because for an effective transfer of the content of machine ID file 809 and key file 811 to a target computer to occur, the target computer must be able to read and utilize the unique diskette attribute from the export key diskette 807. Only when the machine ID file 809 and key file 811 are presented to a target computer on the diskette onto which these items were copied can an effective transfer occur. The presentation of the machine ID file 809 and key file 811 on a diskette other than export key diskette 807 to a potential target computer will result in the transfer of meaningless information, since the unique attribute of export key diskette 807 (such as the diskette serial number) is required by the target computer in order to successfully accomplish the decryption operation.

As is shown in FIG. 33, export key diskette 807 is presented to target computer 813. Of course, the machine identification file 809 and key file 811 are in encrypted form. In the transfer from export key diskette 807 to target computer 813, the content of machine ID file 809 is updated with the machine identification of the target computer 813, and the count of imports utilized. In accomplishing the transfer to target computer 813, a machine identification file 815 is constructed which includes a number of items such as machine identification for the target computer 813, customer information, as well as a list of the machine identification number of the source computer 801. Both machine identification file 815 and the key file 817 are encrypted utilizing a conventional encryption operation which uses as a key a unique attribute of target computer 813. This ties machine identification file 815 and key file 817 to the particular target computer 813.

By using an export/import counter to keep track of the total number of authorized export/import operations, and the total number of used export/import operations, the present invention creates an audit trail which can be utilized to keep track of the distribution of software products during the trial interval. Each source computer will carry a record of the total number of export operations which have been performed. Each source computer will carry a record of which particular export/import operation was utilized to transfer one or more protected software products to the target computer. The memory media utilized to accomplish the transfer (such as a diskette, or group of diskettes) will carry a permanent record of the machine identification numbers of both the source computer and the target computer's utilized in all export/import operations.

The procedure for implementing export and import operations ensures that the protected software products are never exposed to unnecessary risks. When the machine identification file and key file are passed from the source computer to the export diskette, they are encrypted with the unique attribute of the export diskette which prevents or inhibits copying of the export diskette or posting of its contents to a bulletin board as a means for illegally distributing the keys. During the import operations, the machine identification and key files are encrypted with system attributes which are unique to the target computer to ensure that the software products are maintained in a manner which is consistent with the security of the source computer, except that those software products are encrypted with attributes which are unique to the target computer, thus preventing illegal copying and posting of the keys.

Figure 34:
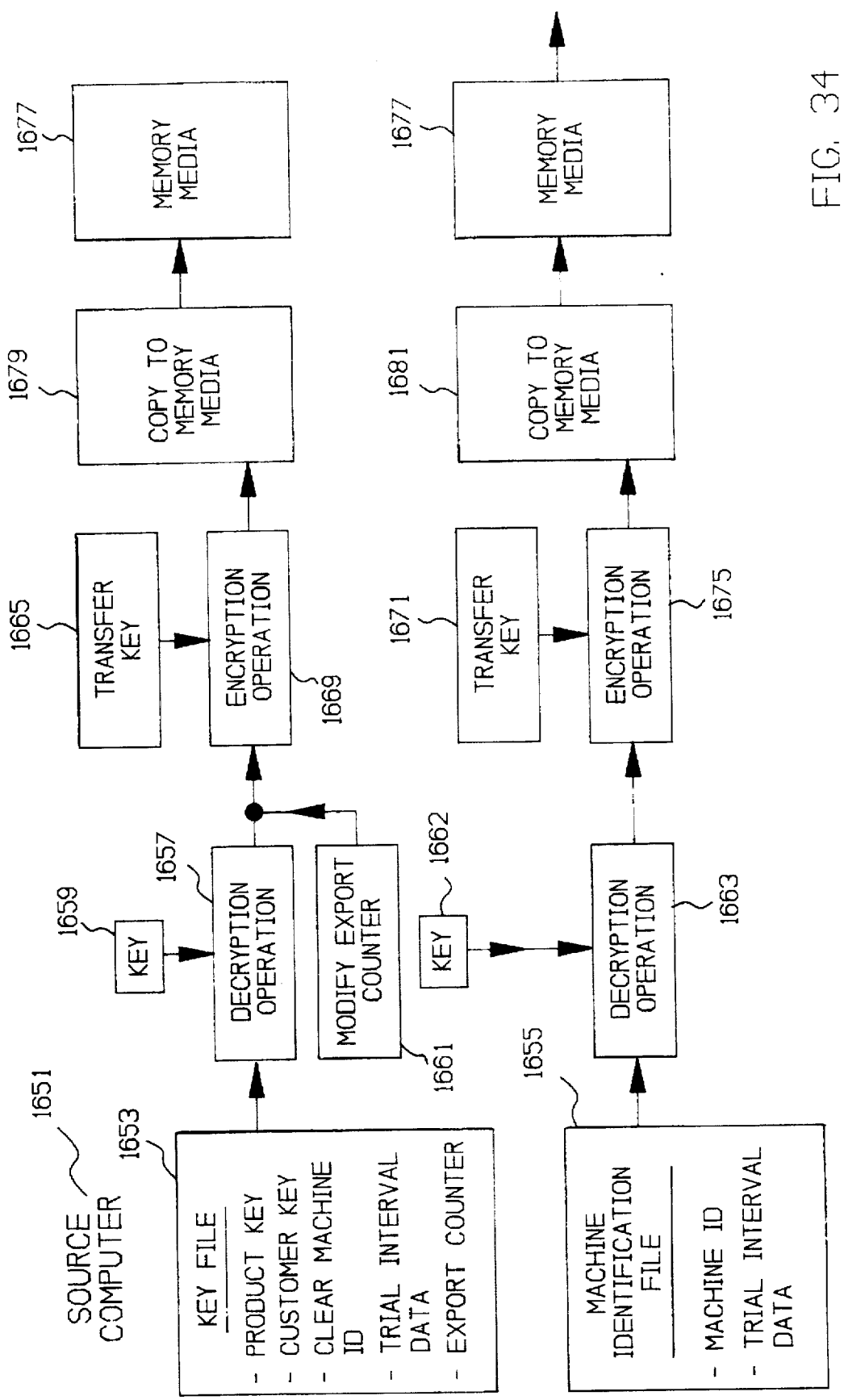
FIGS. 34 and 35 provide a block diagram depiction of an alternative technique for performing an export/import operation.
Figure 35:
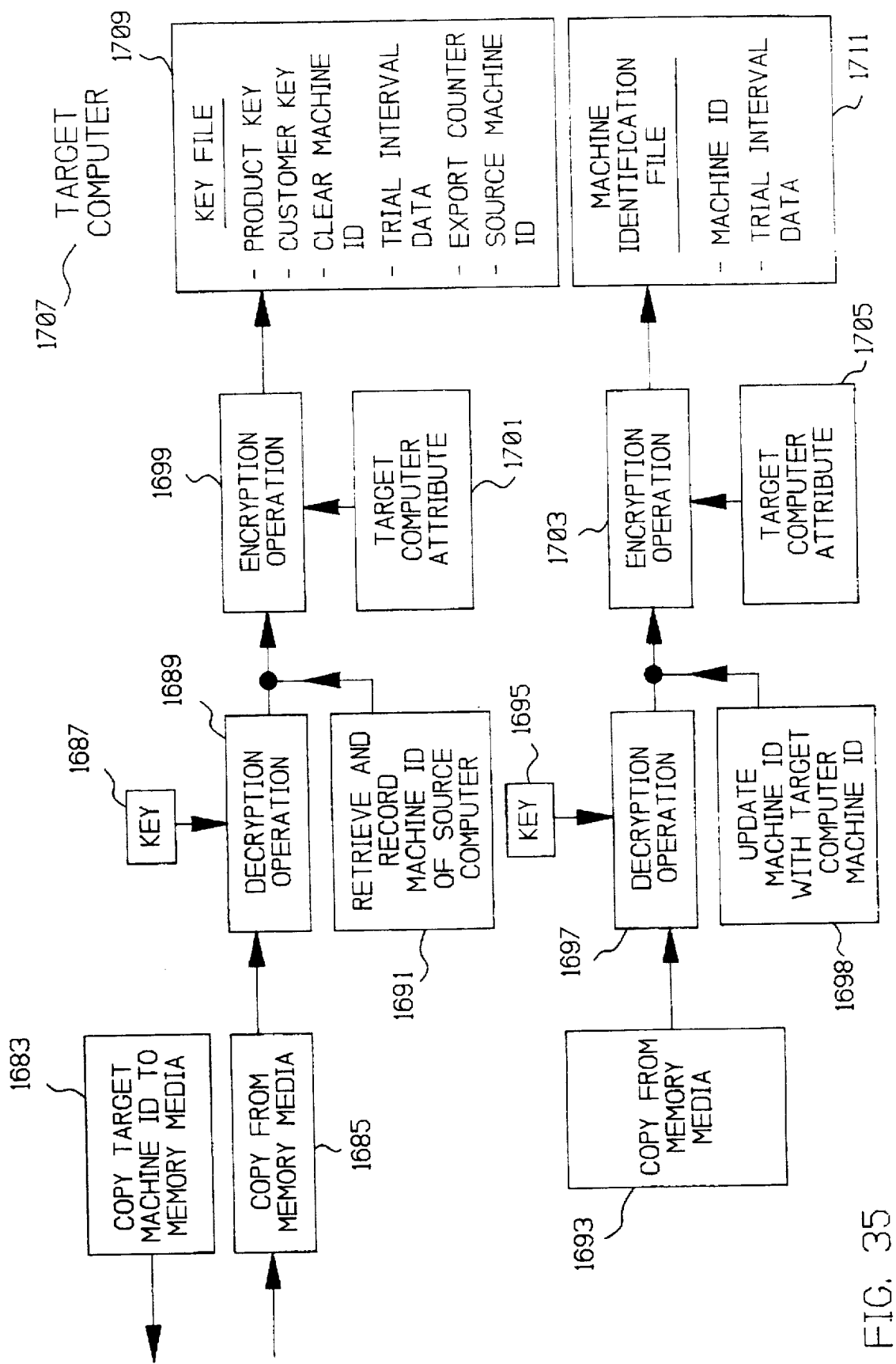

The second embodiment of the export/import function is depicted in block diagram form in FIGS. 34 and 35. In broad overview, memory media 1677 is first utilized to interact with target computer 1707 to obtain from target computer 1707 a transfer key which is unique to target computer 1707, and which is preferably derived from one or more unique system attributes of target computer 1707. The transfer key may be a modification of the machine identification for target computer 1707. Next, the memory media 1677 is utilized to interact with source computer 1651 in an export mode of operation, wherein key file 1653 and machine identification file 1655 are first decrypted, and then encrypted utilizing the transfer key.

FIG. 34 is a block diagram depiction of an export operation in accordance with the preferred embodiment of the present invention. As is shown, source computer 1651 includes a key file 1653 and a machine identification file 1655. Key file 1653 includes the product key, the customer key, the clear text of the machine identification for source computer 1653, trial interval data (such as a clock and/or counter which define the trial interval period), and an export counter which performs the dual functions of defining the maximum number of export operations allowed for the particular protected software products and keeping track of the total number of export operations which have been accomplished. The machine identification file includes the machine identification number and trial interval data (such as a clock and/or counter which defines the trial interval period). Both key file 1653 and machine identification file 1655 are encrypted with any conventional encryption operation (such as the DES algorithm), which is keyed with a key which is derived from a unique system attribute of source computer 1651. At the commencement of an export operation, key file 1653 and machine identification file 1655 are decrypted. Key file 1653 is supplied as an input to decryption operation 1657 which is keyed with key 1659. Likewise, machine identification file 1655 is supplied as an input to decryption operation 1663 which is keyed with key 1661. Decryption operations 1657, 1663 generate a clear text version of key file 1653 and machine identification file 1655. Once the clear text is obtained, the export counter which is contained within key file 1653 is modified in accordance with block 1661. For example, if this is the seventh permitted export operation out of ten permissible operations, the counter might read "7:10". The clear text version of key file 1653 is supplied as an input to encryption operation 1669. Encryption operation 1669 may be any conventional encryption operation (such as the DES algorithm), which is keyed with the transfer key 1665 which was previously obtained. The same operation is performed for the clear text of machine identification file 1655. Transfer key 1671 is utilized as a key for encryption operation 1675, which may comprise any conventional encryption operation, such as the DES operation. Finally, the output of encryption operations 1669 and 1675 are supplied as inputs to copy operations 1679, 1681 which copy the encrypted key file 1653 and machine identification file 1655 to memory media 1677.

FIG. 35 is a block diagram depiction of an import operation. Memory media 1677 (of FIG. 34) is physically removed from source computer 1651 (of FIG. 34) and physically carried over to computer 1707 (of FIG. 35); alternatively, in a distributed data processing system, this transfer may occur without the physical removal of memory media 1677. With reference now to FIG. 35, in accordance with block 1683, the machine identification of the target machine is copied to memory media 1677 to maintain a record of which particular target computer received the key file and machine identification file. Then, in accordance with blocks 1685, 1693 the encrypted key file 1653 and machine identification file 1655 are copied from the memory media to target computer 1707. The encrypted key file 1653 is supplied as an input to decryption operation 1689 which is keyed with key 1687. Decryption operation 1689 reverses the encryption operation of block 1669, and provides as an output a clear text version of key file 1653. Likewise, machine identification file 1655 is supplied as an input to decryption operation 1697, which is keyed with key 1695. Decryption operation 1697 reverses the encryption of encryption operation 1675 and provides as an output the clear text of machine identification file 1655. In accordance with block 1691, the machine identification of the source computer 1651 is retrieved and recorded in memory in the clear text of key file 1653. Next, the clear text of key file 1653 is supplied as an input to encryption operation 1699. Encryption operation 1699 is a conventional encryption operation, such as the DES operation, which is keyed with a target computer unique attribute, such as the machine identification or modified machine identification for the target computer 1707. The clear text of machine identification file 1655 is supplied as an input to encryption operation 1703. Encryption operation 1703 is any conventional encryption operation, such as the DES encryption operation, which is keyed with a unique target computer attribute 1705, such as machine identification or modified machine identification of target computer 1707. The output of encryption operation 1699 produces an encrypted key file 1709 which includes a product key (which is the same temporary product key of key file 1653 of source computer 1651), a customer number (which is the same customer number of key file 1653 of source computer 1651), and clear machine identification (which is the machine identification for target computer 1707, and not that of source computer 1651), trial interval data (which is identical to the trail interval data of key file 1653 of source 1651), and an identification of the machine identification of the source computer 1651. The output of encryption operation 1703 defines machine identification file 1711, which includes the machine identification of the target computer 1707 (and not that of the source computer 1651), and the trial interval data (which is identical to that of machine identification file 1655 of source computer 1651).

While the invention has been particularly shown and described with reference to a preferred embodiment, it will be understood by those skilled in the art that various changes in form and detail may be made therein without departing from the spirit and scope of the invention.

We claim:

1. A method of allowing selective access to an encrypted file, comprising the method steps of:
   providing a plurality of files, the encrypted file being one of the plurality of files;
   attaching an unencrypted security stub, at least partially composed of executable code, to the encrypted file;
   locating the plurality of files in an accessible location;
   generating a user-initiated request for a called file in response to an action taken by a user, the called file being one of the plurality of files;
   translating the user request into a data processing system call;
   receiving the data processing system call using a file management program, wherein the file management program exists in (a) an active state or (b) an inactive state, the file management program being a component of an operating system;
   selectively accessing the called file from among the plurality of files utilizing the file management program, if the called file has the unencrypted security stub;
   accessing the called file from among the plurality of files utilizing the file management program, if the called file does not have the unencrypted security stub;
   processing the called file in accordance with the user-initiated request, to the extent the called file was accessed, wherein access by the user to the certain ones of the plurality of files is controlled by the unencrypted security stub.

2. A method according to claim 1, wherein the steps of selectively accessing and accessing the called file utilizing the file management program further comprise:
   examining at least a portion of the called file.

3. A method according to claim 1, wherein the steps of selectively accessing and accessing the called file utilizing the file management program further comprise:
   if it is determined that the called file has the attached unencrypted security stub, analyzing the attached unencrypted security stub to obtain information for utilization in decryption operations.

4. A method according to claim 1, further comprising:
   if it is determined that the called file has no the attached unencrypted security stub, allowing the called file to be processed;
   if it is determined that the called file has the attached unencrypted security stub:
      (a) examining at least one of (1) the called file and (2) the attached unencrypted security stub, in order to obtain information which allows decryption operations to be performed;
      (b) decrypting the called file; and
      (c) allowing processing of the called file.

5. A method according to claim 1, further comprising:
   if it is determined that the called file has the attached unencrypted security stub, decrypting the called file at the same time as it is passed for further processing.

6. A method according to claim 1, further comprising:
   if the file management program is in the active state and if the called file has the unencrypted security stub, separating the attached unencrypted security stub from the called file prior to processing the called file;
   if the file management program is in the inactive state and if the attached unencrypted security stub is determined to exist:
      (a) preventing the processing of the called file;
      (b) notifying the user of inability to execute the called file.

7. A method according to claim 1:
   wherein the at least one encrypted file comprises at least one encrypted software product, which may be decrypted with a short-lived key.

8. A method according to claim 7, wherein the short-lived key may be used to enable the software product for a particular customer trial interval.

9. A method according to claim 8, further comprising:
   utilizing the file management program to interact with the short-lived key to modify the particular customer trial interval for the software product.

10. A method according to claim 8, further comprising:
    locating the short-lived key in a particular file paired with the called file;
    utilizing the file management program to search for the short-lived key in the particular file paired with the called file.

11. A method according to claim 7:
    wherein the particular customer trial interval comprises at least one of:
       (a) a predefined time interval; and
       (b) a predefined number of processing calls.

12. An apparatus for allowing selective access to an encrypted file, comprising:
    means for providing a plurality of files, the encrypted file being one of the plurality of files;
    means for attaching an unencrypted security stub, at least partially composed of executable code, to the encrypted file;
    means for locating the plurality of files in an accessible location;
    means for generating a user-initiated request for a called file in response to an action taken by a user, the called file being one of the plurality of files;
    means for translating the user request into a data processing system call;
    means for receiving the data processing system call using a file management program, wherein the file management program exists in (a) an active state or (b) an inactive state, the file management program being a component of an operating system;
    means for selectively accessing the called file from among the plurality of files utilizing the file management program, if the called file is has the unencrypted security stub;
    means for accessing the called file from among the plurality of files utilizing the file management program, if the called file does not have the unencrypted security stub;
    means for processing the called file in accordance with the user-initiated request, to the extent the called file was accessed, wherein access by the user to the certain ones of the plurality of files is controlled by the unencrypted security stub.

13. An apparatus according to claim 12, wherein the file management program includes:

means for examining at least a portion of the called file.

14. An apparatus according to claim 38, wherein the file management program further includes:

means for analyzing the attached unencrypted security stub to obtain information for utilization in decryption operations.

15. An apparatus according to claim 12, wherein the file management program is operable in a plurality of operating modes, including:

a pass-through mode of operation if it is determined that the called file has no attached unencrypted security stub, by allowing the called file to be processed;

a decryption mode of operation if it is determined that the called file has an attached unencrypted security stub by:
 (a) examining at least one of (1) the called file and (2) the unencrypted security stub, to obtain information which allows decryption operations to be performed;
 (b) decrypting the called file; and
 (c) allowing processing of the called file.

16. An apparatus according to claim 12, further comprising:

means for decrypting the called file at the same time as it is passed for further processing.

17. An apparatus according to claim 12, wherein the file management program is further utilized to:

if the file management program is in the active state, and if the attached unencrypted security stub is determined to exist, separate the attached unencrypted security stub from the called file prior to execution of the called file;

if the file management program is in the inactive state, and if the attached unencrypted security stub remains attached to the called file:
 (a) prevent execution of the called file; and
 (b) post a message in the data processing system advising of inability to execute the called file.

18. An apparatus according to claim 12:

wherein the at least one encrypted file comprises at least one encrypted software product, which may be decrypted with a short-lived key.

19. An apparatus according to claim 18, wherein the short-lived key defines a particular customer trial interval for the software product.

20. An apparatus according to claim 19, further comprising:

means for utilizing the file management program to interact with the short-lived key to modify the particular customer trial interval for the software product.

21. An apparatus according to claim 19, further comprising:

means for locating the short-lived key in a particular location relative to the called file;

means for utilizing the file management program to search for the short-lived key in the particular location relative to the called file.

22. An apparatus according to claim 18:

wherein the particular customer trial interval comprises at least one of:
 (a) a predefined time interval; and
 (b) a predefined number of processing calls.

* * * * *